United States Patent [19]

Schwartzman

[11] Patent Number: 4,828,403

[45] Date of Patent: May 9, 1989

[54] RESILIENTLY MOUNTED FLUID BEARING ASSEMBLY

[76] Inventor: Everett H. Schwartzman, 2751 Toledo St., Unit #309, Torrance, Calif. 90503

[21] Appl. No.: 35,627

[22] Filed: Apr. 3, 1987

[51] Int. Cl.[4] ............................................. F16C 32/06
[52] U.S. Cl. .................................. 384/100; 384/107; 384/110; 384/124
[58] Field of Search .............. 384/100, 107, 110, 111, 384/114, 118, 119, 124

[56] References Cited

U.S. PATENT DOCUMENTS

| | | | |
|---|---|---|---|
| 3,249,390 | 5/1966 | Schwartzman | 384/110 |
| 3,393,023 | 7/1968 | Christian | 384/119 |
| 3,410,616 | 11/1968 | Dee | 384/107 |
| 3,476,451 | 11/1969 | Schwartzman | 384/110 |
| 3,485,540 | 12/1969 | Nogle | 384/119 |
| 3,589,828 | 6/1971 | Mosimann | 384/100 X |
| 3,674,355 | 7/1972 | Yearout et al. | 384/110 |
| 3,917,366 | 11/1975 | Moson | 384/110 |

Primary Examiner—Thomas R. Hannon

Attorney, Agent, or Firm—Beehler, Pavitt, Siegemund, Jagger, Martella & Dawes

[57] ABSTRACT

A fluid bearing assembly, e.g., air or gas, of the hydrostatic or hydrodynamic type, for use as a spindle and the like, includes spaced journals mounted on a shaft for rotation therewith. The housing includes spaced support bearings cooperating with the journals to form a gas gap therebetween. The support bearings are resiliently mounted in the housing for axial, radial and angular movement through the use of continuous resilient support elements positioned between the housing and the support bearings and continuously in contact with each. The resilient support elements are preferably self-energizing and comprised of relatively low coefficient of friction materials to reduce the friction of the system thus allowing rapid adjustment of the bearing in response to loads on the shaft. Various details are described with respect to the various structures illustrated, including the details of an air bearing spindle assembly of relatively light weight and capable of operating at speeds in excess of 100,000 RPM.

52 Claims, 18 Drawing Sheets

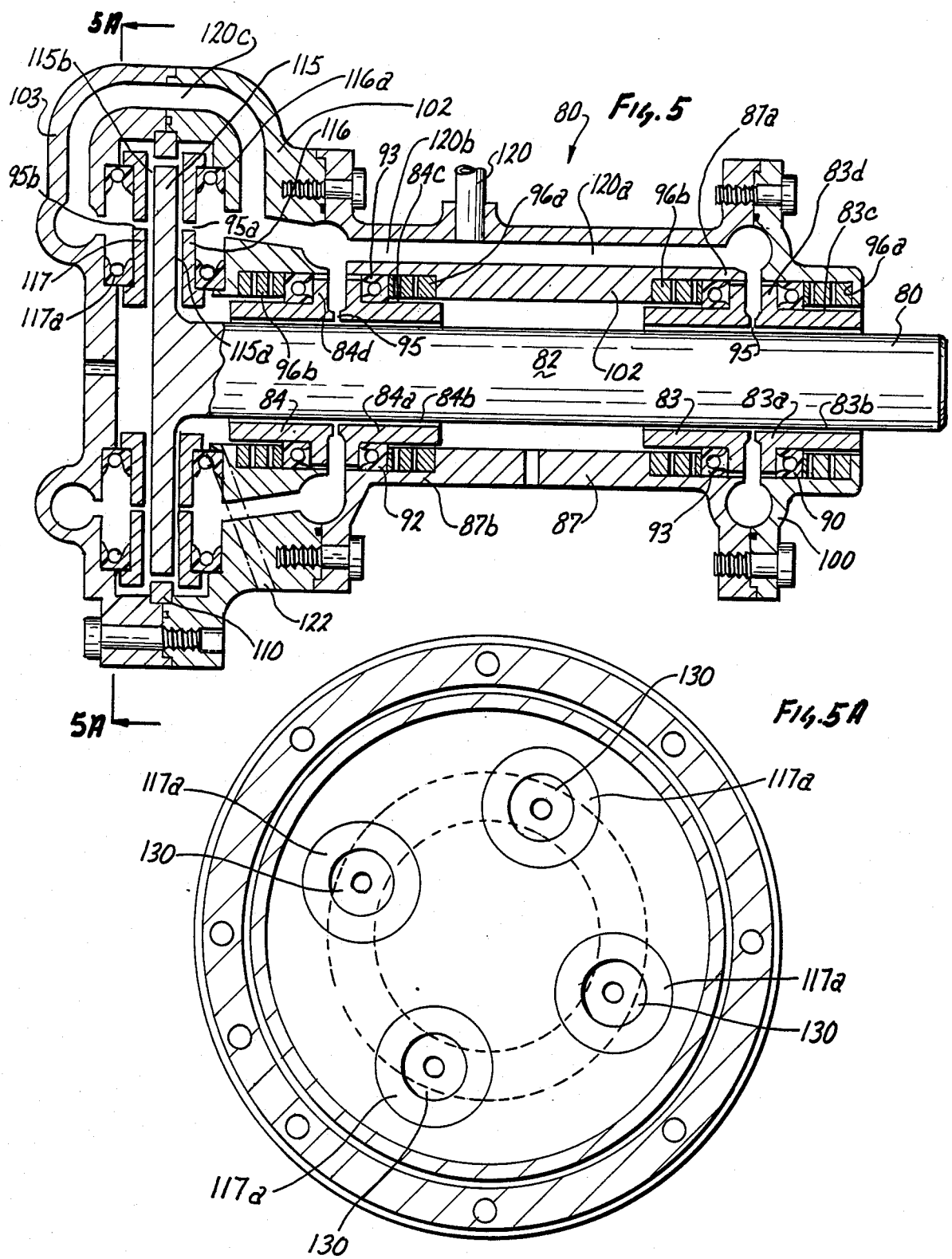

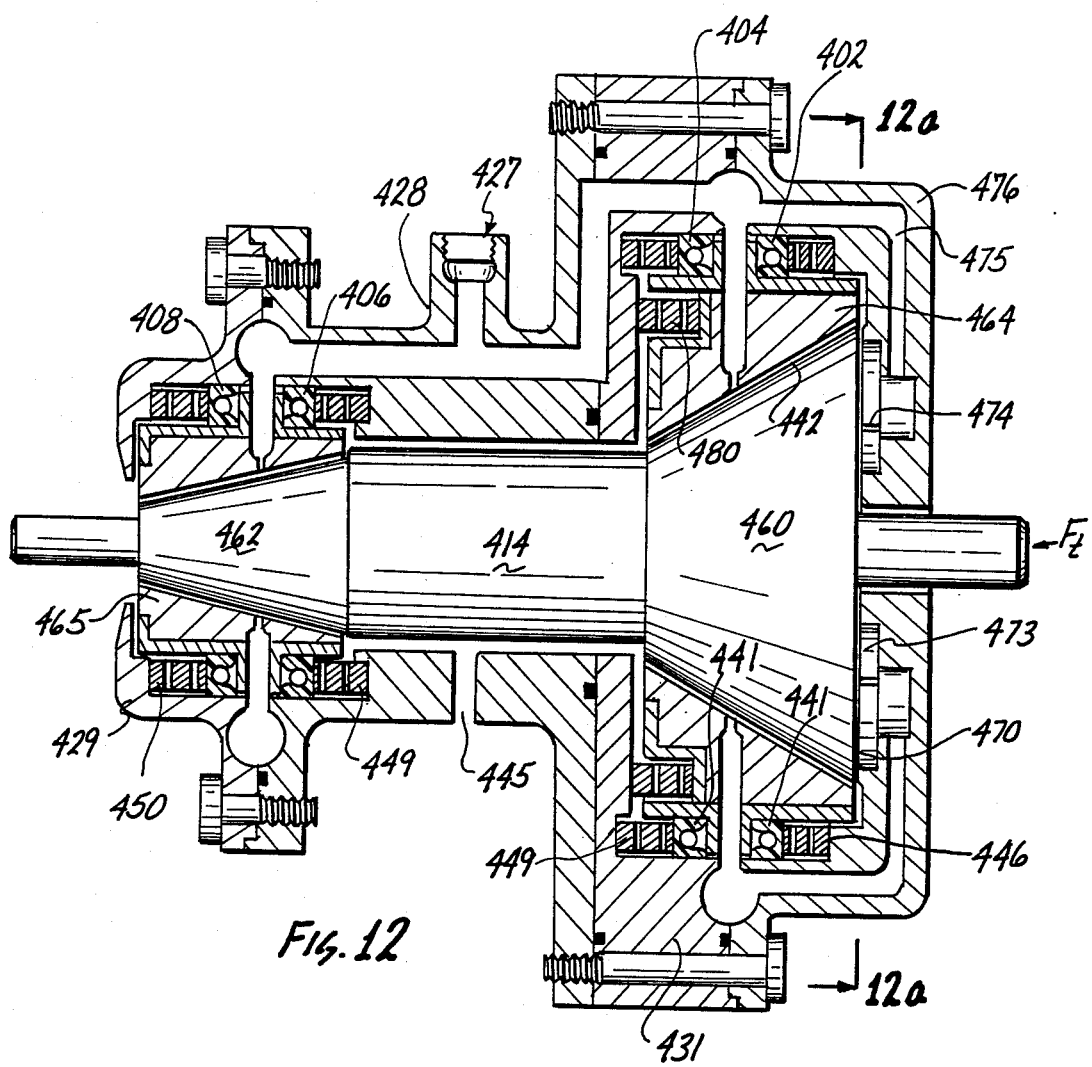
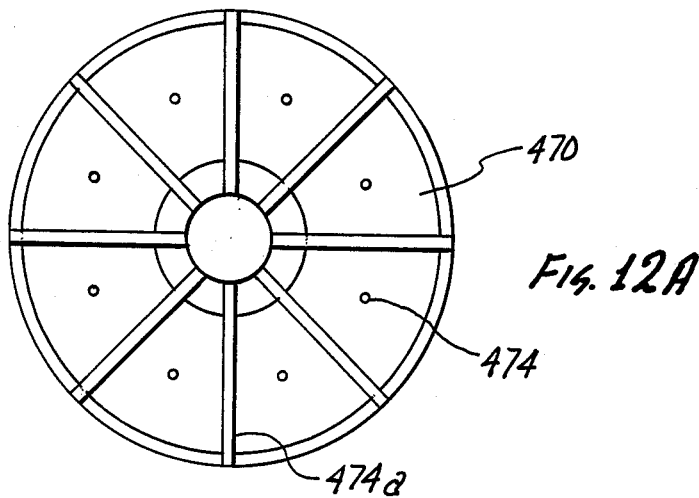
Fig. 12
Fig. 12A

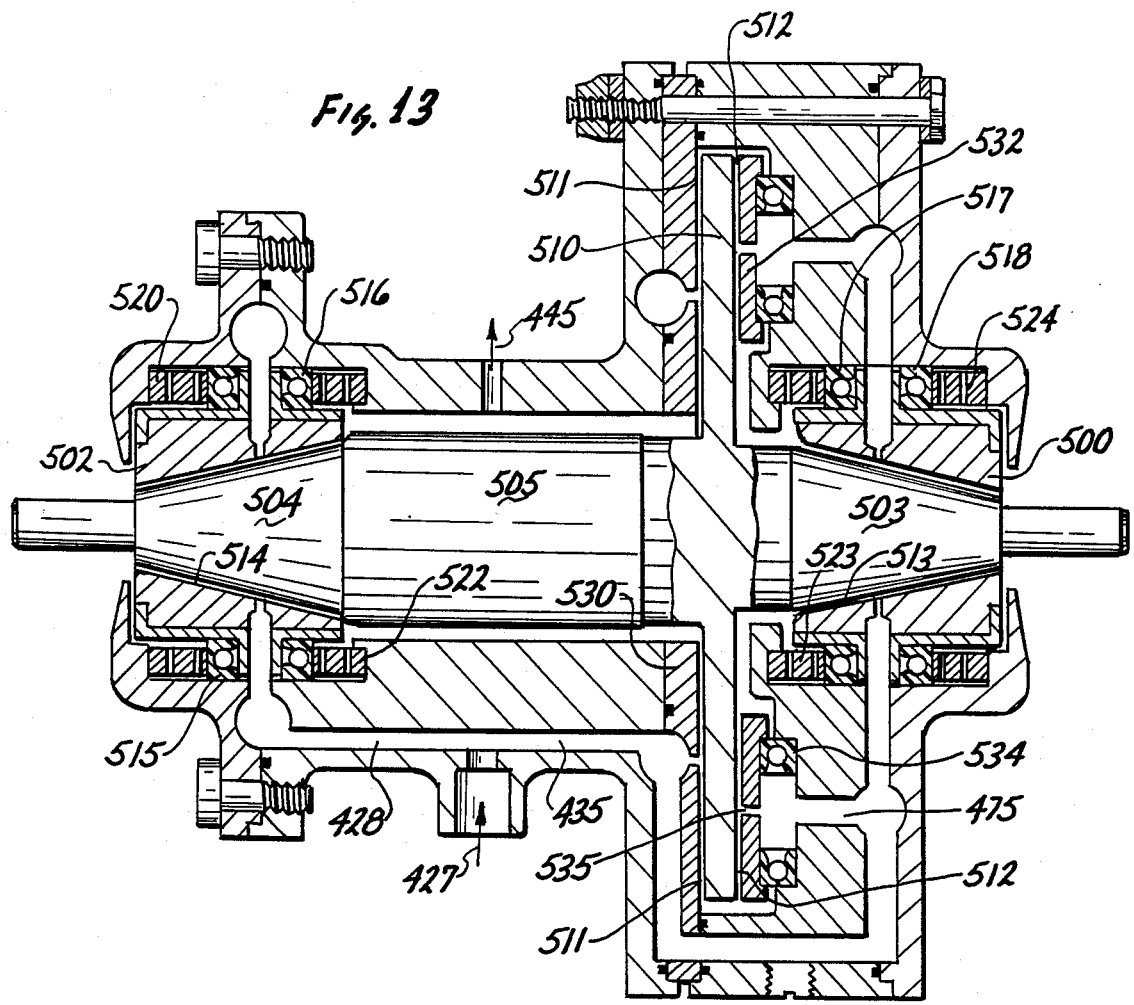
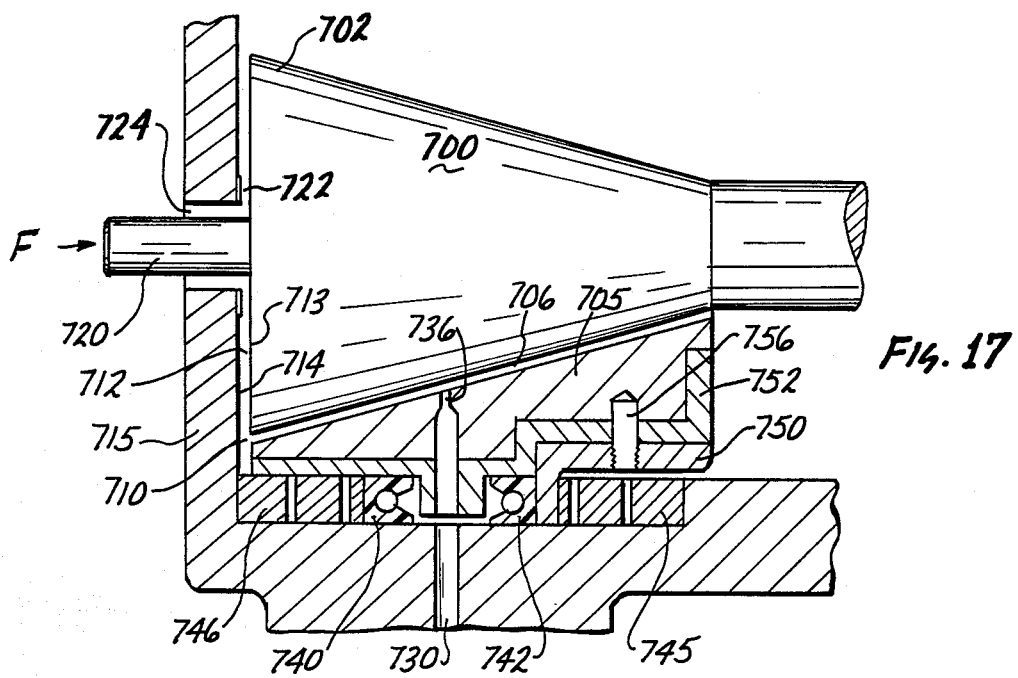

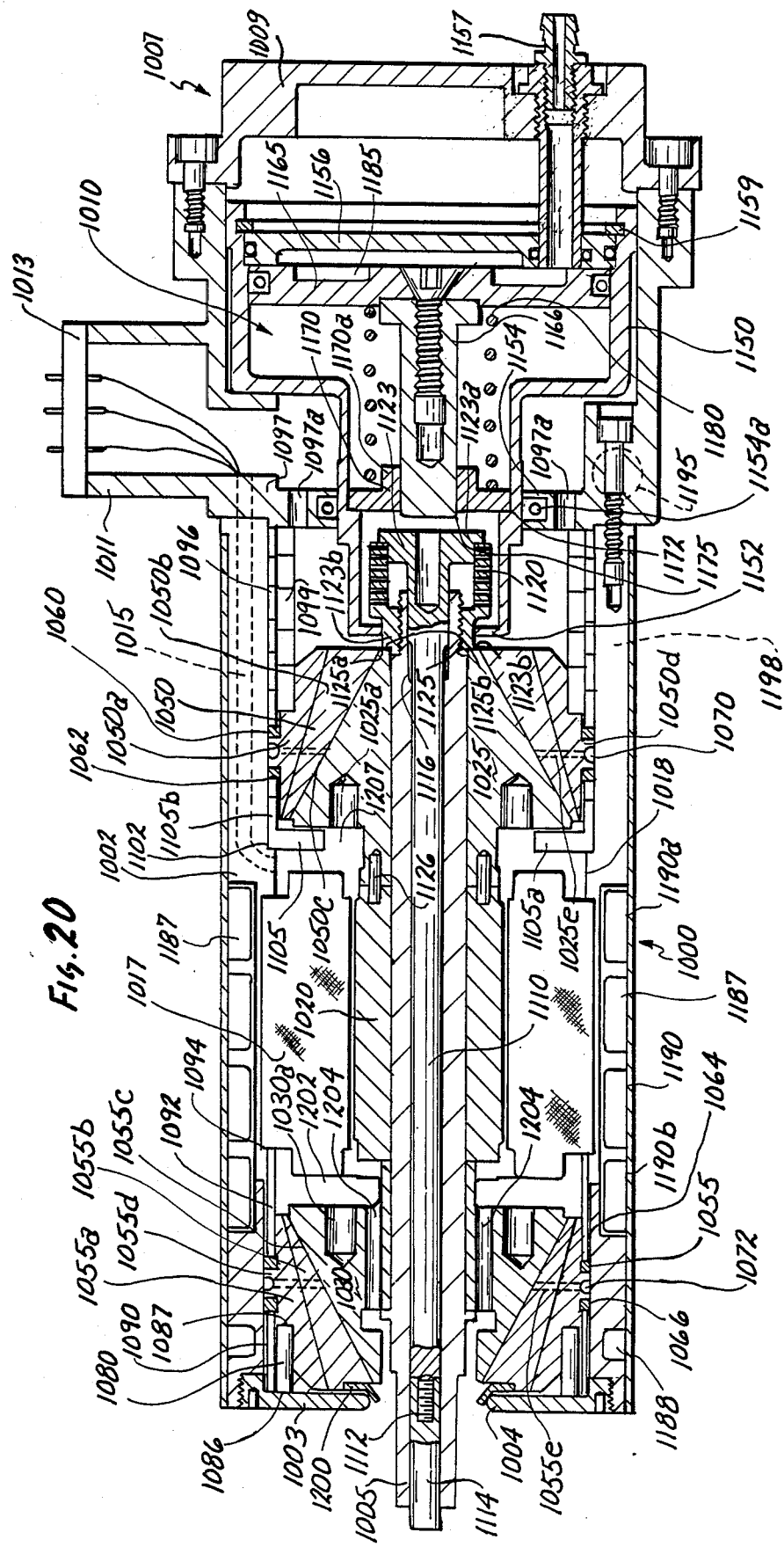

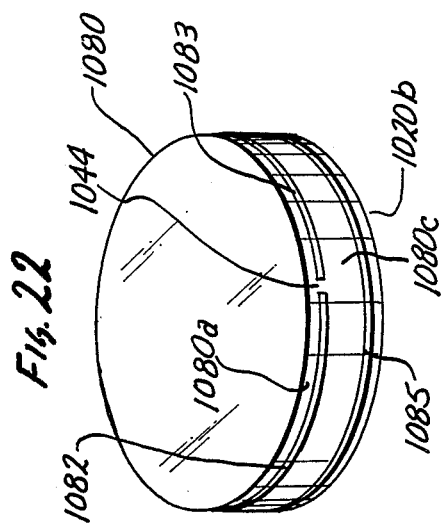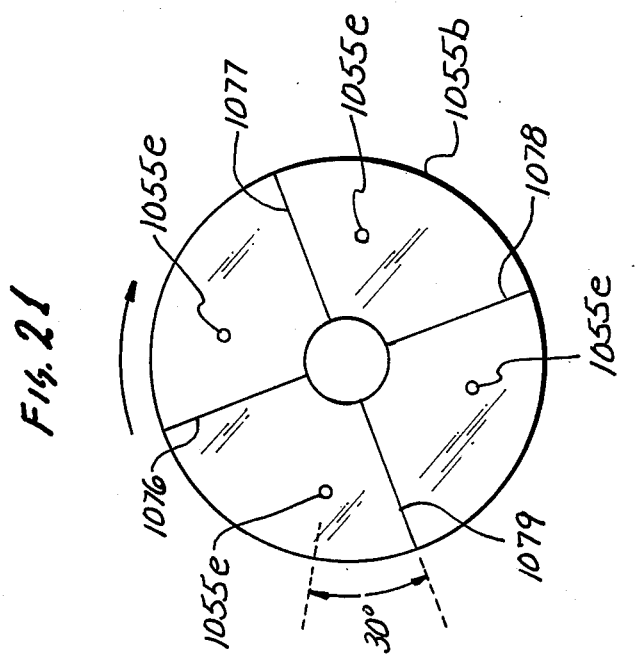

RESILIENTLY MOUNTED FLUID BEARING ASSEMBLY

FIELD OF THE INVENTION

The present invention relates to a fluid bearing assembly and more particularly to an improved and relatively simple resiliently mounted fluid and gas bearing assembly including a rotor or shaft member supported by at least two spaced resiliently mounted bearings each of which is movable, for example, in essentially three axes, radially, axially and angularly with respect to a support structure thereby assuring a proper gap between the shaft and the support bearing, especially in response to thrust loads, thus providing a precision assembly of relatively simple structure which is relatively easy and inexpensive to manufacture and of relatively light weight.

BACKGROUND OF THE PRIOR ART

Fluid bearings, especially gas bearings, are known in the art and which are effective for the purposes intended. For example my prior U.S. Pat. Nos. 3,249,390 and 3,476,451, whose disclosures are incorporated herein by reference, describe fluid bearing systems and gas bearing systems which operated satisfactorily but which were difficult and relatively expensive to manufacture and which had a relatively large profile and were relatively heavy due to the large profile.

Those structures included spaced bearings and a rotor or shaft in which the forward bearing was relatively fixed, during operation, with respect to axial and radial and angular motion. In one form, there was no spring support for one bearing while the other was supported at spaced points along the outer periphery. In another form, the hydrodynamic form, the forward support bearing was fixed axially. For the purposes of this invention, the terms shaft and rotor refer to the rotating part while the term bearing refers to the fixed, i.e., non-rotating element which supports the shaft for rotation on a fluid or gas film. While the rear bearing of these prior structures permitted limited axial movement, and limited radial and angular movement, the assembly as a whole was limited in movement in that only one end of the rotor or shaft was capable of limited movement. As a result, in the event of a significant force axially of the rotor or shaft, or angularly or radially of the moveable end of the rotor, the forward end of the rotor would tend to contact the forward supporting bearing and bottom out on that bearing. The result was a catastrophic failure of the bearing assembly because of the failure to mount the supporting bearing in a resilient manner, to be described.

Thus, there are limitations in that prior art structure as described in my prior patents. More specifically, the support bearings were supported at three separate points disposed 120 degrees to each other such that the forward support bearing was essentially fixedly supported in operation, but with relatively severely limited movement. The forward support, during operation, was urged axially of the rotor to seat against the opposed face of the supporting housing by annular shoulders on the support. In order to move radially, it was necessary for the forward bearing to overcome the friction of the shoulders against the housing. Seals between the support bearing and the housing were in the form of piston rings, which were split, somewhat similar to those of automotive piston rings. Due to the three point support and the fact that the support bearing was seated against the housing, the forward support bearing was not capable of angular movement with respect to the rotor axis and to the extent that there was any movement at all, there was relatively high friction.

As a result the friction, coulomb friction, of the forward support bearing assembly, the friction of the total bearing assembly was relatively high and was used as a dampening effect. It was believed then that the coulomb friction, i.e., the friction which has to be overcome to effect relative movement of non-lubricated parts, was operative to provide a dampening effect between the forward support bearing and the remaining structure to overcome the radial oscillatory motion of the assembly.

The total friction of the assembly, however, was relatively high, although it was thought at that time to be acceptable. The system was intended to be a two degree freedom of movement system including two springs and two masses. The rotor was one mass and the support bearings were the second mass while one spring was the gas film and the other spring was the radially located separate three spring system, as described, between the support bearing and the housing. Since one of the support bearings was fixed axially in operation and capable of some radial movement at a relatively high friction, the effectiveness of the system as a two degree of freedom system was somewhat less than desired. This became apparent when one attempted to use the prior described bearing at relatively high rotational speeds and where axial loads were placed on the rotor.

In such a case, the entire structure must be capable of responding relatively rapidly to changes in load and pressure in order to operate satisfactorily. To achieve this, it was determined that axial, angular and radial motion was desirable in order to provide the relatively rapid response needed to accommodate changes in load and pressure, and especially in response to thrust loads. Further, such motions had to be achieved with relatively low friction, i.e., relatively low coulomb friction, so that the parts responded quickly and relatively smoothly rather than being relatively non-moveable until the relatively high coloumb friction was overcome.

In addition to the above, it is known in the prior art to use O-rings as a seal between the bearings and the support housing in which the bearings are mounted. The difficulty with O-rings is that they are usually compressed radially to function as a seal and are of limited resiliency in a radial direction and tend to perform erratically as the temperature increases. Further, O-rings tend to degrade over time due to chemical changes in the material of which the rings are made. Normally, these O-rings are not considered to be resilient support elements, but more of a sealing element with the result that they tend to be relatively high friction elements, even if coated with low friction material such as polytetrafluoroethylene or other fluorocarbon or low coefficient of friction materials. As such, the inherent design of the O-ring is somewhat controlled in the sense that one has to design the environment in which they are used to match the structure to the character of the O-ring. This imposes some severe limitations on the use of O-rings, especially if it is necessary to provide a resilient support operative over a wide range of operating temperatures, for relatively long periods of time, and which is capable of adjusting to different types of relative movement between the mating parts.

In general, gas lubricated bearings are normally assumed to have a given spring constant and a small amount of inherent damping. The spring constant may be measured by plotting a force displacement curve while the damping coefficient may be determined by ascertaining the decrease in amplitude as a function of time of a bearing system after it is subjected to an impact load.

However, gas bearings are different from more conventional bearings in the sense that there is a finite time lag between the initial application of a displacement force and the time required for the bearing to reach a steady state condition. Upon extensive investigation of experimental evidence, it was noted that this time constant or time lag is difficult to measure because it is obscured by the bearing's damping. This time constant can be calculated and becomes larger if pocket type bearings are used. It can also be shown by computer simulation that, in general, the longer the time constant (first-order lag), the more unstable the system becomes. This time lag is caused by the fact that a finite amount of time is required for the gas to flow out of the bearing or into the bearing until a new pressure distribution has been reached.

It is known that a pocket type bearing has a greater restoring force, i.e., the force tending to establish a balancing equilibrium condition, an since a resiliently mounted fluid bearing is more stable, a bearing system employing pockets may be utilized. Thus, a resilient mounted system may be designed for a gas bearing in which the added advantage of the greater restoring force associated with pocket type bearings can be used even though they have a longer time constant.

As pointed out in the patents previously referred to, there are applications in which the use of conventional lubricants in a bearing presents significant problems. For, example, in cryogenic applications, ordinary petrolubricants and the like, or silicone lubricants become unusable due to the fact that they become viscous or solid. In oxidizing environments, some lubricants are totally unacceptable due to possible catastrophic failure. Materials such as graphite may be used, but are of limited utility. All of these, and other factors are discussed in the prior patents referred to previously.

In instances in which the gas bearing is used to support high speed spindles, in the range of 15,000 and preferably 80,000 to 130,000 or higher RPM, such as those used in circuit board drilling machines or other high RPM accurate drilling equipment, the debris caused by such operations produces "cuttings" which may be quite abrasive or otherwise hostile. Properly designed in accordance with this invention, rotational speeds as high as 450,000 RPM may be achieved. The cuttings usually are relatively light weight and are in the form of relatively fine dust which may infiltrate the bearing or the spindle and which may shorten the life thereof because of the introduction of relatively abrasive particles into the relatively small space between normally precision and manufactured parts which rotate relative to one another. For example, roller bearing spindles suffer the problem of a relatively high wear due to the presence of fine abrasive particles unless some special and sometimes relatively heavy and expensive structures are provided to prevent entry of such abrasive particles into the working space between the relatively stationary and rotating elements of the bearing and spindle assembly. Such debris may cause serious damage to O-ring seal systems.

In the case of that type of environment, the use of a gas lubricated bearing, in accordance with the present invention offers singular advantages because the bearing structure is relatively immune from such relatively hostile environments since the exhaust of the gas used in the bearing prevents most of the debris from entering the bearing or spindle housing. Nonetheless, there are other concerns regarding the use of gas bearings due to some of the problems traditionally associated therewith, some of which have already been discussed.

Gas lubricated bearings and spindle assemblies are known in the art and some of these have attempted to overcome the problems noted. However, these structures, some of which are described in patents noted and some of which are currently commercial products, such as the gas bearing available from Federal Mogul Corporation under the trademark WESTWIND, have not solved the problem of a light weight and reliable structure capable of operating at comparatively high rotational speeds in environments which generate hostile and abrasive products. For example, the Westwind ball bearing system weighs about five or more pounds, while the Westwind gas bearing system is heavier and requires air filters for the incoming air and air driers to reduce moisture thereof as well as refrigeration systems to cool the incoming air.

One of the advantages of the present invention is the provision of a resiliently mounted gas lubricated bearing which is essentially immune to such a hostile environment since the exhaust gas discharged by the bearing prevents essentially all of the debris from entering the bearing or spindle housing. The obvious advantage is that there is no need for relatively heavy sealed and grease lubricated assemblies, while providing a relatively light weight structure capable of operation at comparatively high speeds and in environments in which corrosive products tend to adversely affect the performance of even sealed lubricated assemblies.

More recently, efforts have been made to overcome the above noted problems through the use of conventionally lubricated bearings. The results have been products of relatively low useful life and which are relatively heavy and bulky in order to provide the encapsulation shielding needed to reduce the effects of such corrosive and harmful products. Even so, the results have been marginal at best as compared to this invention.

In the case of gas lubricated bearings in general, lubrication is achieved by containing a thin film (about 0.0005 of an inch) of gas between an accurately machined shaft journal and the bearing. The result has been to provide bearings for special applications which are substantially insensitive to super extremes in temperature. Further, since there is no contact between the relatively rotating parts, there is no coulomb friction, heating or rubbing, and consequently no wear from such effects. As is understood, properly designed gas lubricated bearings may be operated at very high rotational speeds, with long life and stable performance characteristics. Nonetheless, the prior designs have yet to reach that level of performance in terms of light weight and high rotational speeds which gas lubricated bearings are capable of achieving.

Gas lubricated bearings may be of the hydrostatic or hydrodynamic type. Both types are contemplated by the present invention. In a hydrostatic bearing, gas is continuously supplied to the bearing interspace under a predetermined pressure. In hydrodynamic gas bearings, the gas lubricating film is self-maintaining when relatively high tangential velocities are reached, relative to the bearing surface and shaft and may, if desired, be totally isolated from other sources of gas. This capability to be sealed off causes hydrodynamic bearings to be attractive in applications such as gyros and the like where the maintenance or use of a source of pressurized gas may not be feasible.

Yet, the machining tolerances for bearings of the hydrodynamic type are significantly more stringent than for the hydrostatic type of bearing. In the hydrodynamic bearing, the bearing interspace gap is usually less than about 0.0001 of an inch. This relatively small gap gives rise to detectable viscous friction at high bearing speeds and is manifested as drag on the rotary shaft. Further, the self-maintaining of the film pressure inherently limits the versatility of the load capability and the selection of critical (resonant) angular speeds of the bearing.

In the case of hydrostatic bearings the machining tolerances are relaxed somewhat as compared to hydrodynamic bearings but are nonetheless stringent. Moreover, the gas feed into the bearing interspace must, in some cases, be angularly symmetric in order to support the rotary shaft thus to preclude imbalance with respect thereto. Even so, the hydrostatic approach provides a more versatile and stable bearing because of its control ability and larger spacings.

The prior art devices in the gas bearing area, including the patents previously referred to, achieve support for axial and radial thrusts or loads by the use of a pair of juxtaposed spaced cylindrical surfaces and a pair of juxtaposed spaced radially arranged surfaces wherein one surface of each pair is on the shaft and its juxtaposed counterpart is or is supported on a stationary frame or housing. There is no appreciable cooperation between the two bearing parts, their supporting forces being mutually orthogonal.

A generic deficiency of the prior art gas bearing structures, including those of the patents identified, is that regardless of the machining tolerances and regardless of the care with which the shaft is loaded in use, a finite rotary imbalance exists which causes an oscillation in conjunction with the elastic restoring force of the supporting gas film. While these bearing assemblies are thought of as being two degree of freedom systems composed of two springs and two masses in that the rotor and bearing are the masses and the gas film and supposedly resilient mounting are the spring system, they do not behave as two degree of freedom systems.

In practice, the supporting gas film has a relatively low "spring" constant and the resonant critical speed of the shaft is so low as to be a severe limitation on high rotary speed applications of gas lubricated bearings. The severity of the resonance problem is caused by the fact that the near zero viscous friction of the gas film affords near zero damping of the oscillating bearing. Consequently, the bearing structure tends to oscillate without limit until the moveable element strikes the stationary bearing or bushing. Typically the resulting coulomb friction precludes driving the shaft above the critical frequency or causes destructive wear or both. Where the coulomb friction is relatively high, as is the case in the structures of the patents referred to, the response of the bearing system as a whole to changes in load, pressure and the like is relatively slow and this tends to promote bearing "crashes" or limits the use of the bearing in terms of rotational speed. In effect the system is essentially fixed and relatively incapable of axial, radial and angular movement to compensate effectively for such variations during operation of the bearing system.

Another difficulty with the gas bearings of the prior art is loss of gas film pressure with the result that there is metal-to-metal contact at certain rotational speeds. It is believed that this is due to "whirl", a phenomenon which is caused by the rotating shaft being displaced, due to its weight, off-center with respect to the axis of the stationary bushing. In effect, the shaft rotates on an axis such that one end of the shaft circumscribes a circular track, with the result that the shaft is closer to the bushing at one point than at others, and the shaft experiences angularly out-of-balance viscous drag. This drag, or the reaction which it produces, is usually in the of the shaft rotation and effectively causes a rotation of the shaft which is effectively angularly unsymmetrical. The whirl rotation, being due to the reverse-directed drag, is usually the same as the shaft rotation and is seen by the gas support film as a reduction in shaft velocity. Thus, with increases in the whirl velocity, since it is in the same direction of shaft rotation, a significant reduction in the support capability of the fluid film may occur with the result that there is metal-to-metal contact between the rotating and non-rotating parts at high speeds. While the restoring force and the whirl resistance of the film may be influenced, to some degree, by the fluid pressure in the case of a hydrostatic bearing, and the mass of the shaft may be minimized in order to increase the critical speed, these represent comprises in the stability and load capability of the bearing and do not represent a generally applicable solution to the problem.

In general, the solution to the problem, as set forth by this invention, is to make the interior of the bearing structure resiliently self-adjusting so that it responds rapidly to these events. This may be accomplished by relative angular, rotational and axial movement of the support bearings. By contrast, the structure of the patents previously identified is such that the support bearings are not moveable angularly at the front end and the bearing has a relatively high friction in a radial direction, with little if any movement in an angular direction. While that system appears to be a true two degree of degree of freedom system, in structure and operation it is not.

Thus, it is an object of the present invention to provide an improved fluid, preferably a gas, resiliently mounted lubricated bearing and method which are not subject to the disadvantages of the prior art systems referred to above.

Another object of the present invention is to provide a bearing structure of the type to be described in which the bearing assembly which provides the fluid or gas film for rotation of the shaft is resiliently mounted in essentially a free floating condition.

An important object of this invention is the provision of a fluid and preferably a gas bearing system, capable of operation at relatively high rotational velocities, in which the bearing assembly is flexibly and resiliently mounted to a support structure so that the relative movement of the bearing and the shaft is such that the gap between the fluid supported shaft and the bearing is maintained to permit the entire structure to compensate for relative axial movement of the shaft and to compensate for relative angular and radial movement of the shaft with respect to the assembly which supports the bearings and the shaft.

It is another object of this invention to provide a gas bearing system in which a pair of juxtaposed surfaces, resiliently mounted, provides resilient and compensating support for both axial and radial thrust of the rotatable shaft.

Still another object of this invention is the provision of a bearing system of the type described in which the gas or other fluid film thickness in both a radial and axial direction is adjustable by the resilient axial or radial relative movement of one of the relative supporting surfaces through a unique resilient mounting thereof.

Another object of this invention is the provision of a fluid and preferably gas bearing system in which frictional damping is coupled to the radially oscillating shaft without solid-to-solid contact between the rotating shaft and the supporting structure by the provision of a unique flexible and resilient mounting with permits relatively rapid adjustment of the relative parts to maintain the required fluid and gas gap between the relatively moving parts.

Yet another object of this invention is the provision of a bearing system of the type described in which the allowable amplitude of radial oscillation of the shaft at critical frequency, without solid-to-solid contact, may be increased without increasing the quiescent thickness of the fluid supporting film through the use of a unique resilient supporting system.

Still another object of this invention is the provision of an improved three-degree of freedom resiliently mounted bearing system of the type described in which the thickness of the fluid, preferably a gas, film is essentially self-adjusting by the provision of an effectively self-adjusting film thickness achieved through the use of a unique resilient mounting system of the bearing system which allows the weight and profile of the bearing system to be reduced while achieving relatively high rotational speeds through the achievement of essentially the required compensation due to relative axial, angular and radial movement of the relatively moving parts.

SUMMARY OF THE INVENTION

The above and other objects of this invention are achieved in accordance with the present invention through the provision of a relatively simple improved bearing support system which provides a resilient mounting of the bearing support assembly with respect to the support structure such that the shaft is supported on a fluid or gas film, which acts as a lubricating film, in a true three degree of freedom system.

Thus, in accordance with this invention, the shaft is supported for rotation on a fluid or gas film by spaced resiliently mounted and preferably spaced bearings. The bearings are resiliently mounted by relatively low friction support elements preferably having inner and outer low friction support surfaces which may also act as seal surfaces. These resilient support elements are positioned between the bearings and a support structure for the bearings such that the inner low friction surface is continuously in contact with and fully surrounds the bearing while the outer low friction surface is continuously in contact and is effectively surrounded by the opposed surface of the supporting structure. Resiliency is achieved through the use of spring elements associated with the low friction elements.

This type of support permits relative axial movement of the shaft and permits relative angular and radial movement of the bearing with respect to the support such that the fluid gap between the bearing and the shaft is maintained and rapidly adjusted during rotation of the shaft. In this way, the bearing is allowed motion which is oscillatory with its own resonant frequency due to its resilient supporting structure and mass. Friction between the resiliently mounted bearing and the support structure, which is relatively low in comparison to prior structures, allows relatively rapid response to dampen out the radial oscillatory motion of the bearing relative to the support structure.

Briefly, in operation, oscillations of the rotary shaft drive the radially "floating" bearing through the supporting gas or fluid film "spring" as a linkage. This permits the shaft a greater amplitude of oscillation without effectively increasing the thickness of the supporting film. At the same time, the friction experienced by the supporting bearing is coupled back through the fluid film linkage to the radially oscillating shaft thereby subtracting from its oscillatory energy without solid-to-solid contact. The natural frequency of the suspended supporting bushing is relatively low so that once the shaft has passed through its critical frequency, there are no further resonance problems and the shaft may be rotated at higher speeds with ever decreasing oscillation amplitude.

One of the deficiencies of conventional roller bearings is in precision surface grinding applications wherein bearing noise is substantially always present and is manifest as imperfections or "noise" on the ground surface. This occurs because the bearings, typically ball bearings, are inherently imperfect and drive the shaft in a regular imperfect rotation. One of the advantages of this invention is that the bearing operates above its critical (or resonant) frequency of rotation and rotates regularly and essentially perfectly about its true axis of revolution. If a grinding wheel affixed to the shaft is dressed at the operating speed of the fluid supported and lubricated bearings of this invention, then the grinding wheel system will rotate essentially perfectly about its true and real axis in a manner to permit "noiseless" precision surface grinding.

Still another advantage of the bearing assembly of this invention is that since the bearing rotates about its true mass, it can effectively be utilized for high speed miniature drilling applications. This is possible because the drill holding mechanism can be manufactured using a suitable and well known grinding system, after balancing, and during actual rotation of the assembly. This ensures almost perfect alignment of a miniature drill with the axis of rotation, which would also coincide with the center of gravity of the rotation shaft.

As will be apparent, the resilient mounting of the bearings through the use of self-energized spring biased resilient support elements which may also act as seals offers a structure having greater side load capacity due to forces imposed on the end of the shaft when used in a milling or routing machine. This is because the flexible and resilient support elements allow the bearings themselves to tilt somewhat independently. Properly located, as will be described, the tilt axis of the shaft due to side load on one end and the tilting of the bearing can be made to have the same angle. The result is that a much greater side load may be applied on the bearing assembly before rubbing occurs. The design of this invention has greater side load capacity than prior art gas bearings.

The feature of the present invention of using selfenergizing resilient bearing support elements which may also act as seals provides great shock capacity by allowing the rotor or shaft to move. Typically the self-energizing resilient support elements are in the form of a V- or U-shaped double lip element having an inner and outer continuous and flexible relatively low coefficient of friction support surface and an associated spring member. The portion of the resilient support element forming the lip-like support elements preferably includes a spring member associated with the lip-like support elements. These components effectively form a resilient and self-energizing support element for the support bearings and these support elements are sufficiently flexible to allow the rotor or shaft to move slightly.

If the spring constant of the resilient support elements and spring and the thrust take up capacity is somewhat less relative to the gas bearing fluid spring constant, this allows the support bearings to move and therefore allows the rotor or shaft to move. Due to its own inertial forces, a much greater impact can be withstood by the bearing assembly of this invention.

Such greater impacts may occur in such operations as drilling with a rapid feed rate and a rapid repetition rate which causes an impact type contact between the drill and the material being drilled. This, in turn, transmits this impact to the rotor/shaft and to the support bearings.

In accordance with this invention, a thrust take-up system is provided in addition to the radial and angular resilient mounting of the support bearings, preferably in the form of a resilient mounting to take up axial movement of the shaft in response to axial loads. The thrust-take up system again involves the use of a resilient support system which may include thrust springs. The main advantages of the thrust springs, which form part of the resilient support elements, are that they allow for self-adjustment and self-alignment; allow a greater amount of shock to be absorbed without causing the bearings to bottom out, while transmitting the thrust to the support structure.

In accordance with this invention, there are two basic regimes by which the springs which form part of the resilient support elements are associated with respect to the support bearings for performing the function of transmitting forces and for holding the various parts in the relative correct position. In the case of relatively small gas or fluid bearing assemblies, it is easier to carry all thrust loads, which are not large due to the small size of the support bearing, through the structure of the resilient support elements themselves. If a round garter-type spring is used in the resilient support elements, then that spring has to transmit essentially the entire load. If a flat plate type of spring is used, then the construction of the support bearings in the area containing the spring can be made such that essentially all of the axial loads are transmitted directly through the support surfaces of the lip-like elements, from the support bearings into the supporting structure.

A structure is also disclosed wherein the resilient support element is retained such that essentially all of the axial load goes directly from the support bearing into the spring and into the housing without going through the lip-like support elements. In that particular form, the only loads that the lip-like support elements see, other than radial loads, are the gas pressure loads which keep the lip-like support elements sealed to the associated structure.

Since the springs and their spring constants may be controlled, as is known in the art, forms of the present invention may be provided such that there will be greater thrust capacity in one direction than in the other. This is achieved since two springs are used in each direction, one generated by the gas film and the other being that of the main springs which take the axial load. Therefore, it is possible in accordance with the present invention to fabricate the rear main spring of a lower spring constant than that of the front main spring. Upon a thrust force in a backward direction, the front spring will decrease its force at a much more rapid rate than the back axial spring. This allows a larger gas film gap in the front bearing than the corresponding smaller gap in the back, so that the net force will be greater than in a conventional system where the gas film is more or less equal at each end. This added effect of being able to obtain greater thrust in one direction than the other may be utilized where necessary, such as in drilling applications where greater thrust is required during actual drilling than during the drill extraction phase.

In the case where one desires great thrust capacity in a small size or increased thrust capacity in a given size bearing, an embodiment of this invention is described whereby three effects are taken advantage of to obtain a much greater thrust capacity in any given size that any other gas bearing system known in the prior art. This added feature is fully described and may be summarized as follows: The area at each end of the supporting bearings, which are conical and turned outward, are such that the larger area is utilized as a thrust piston type of device. So arranged, the bearing system is maintained in equilibrium when in a no thrust load condition to prevent the shaft from rubbing on surrounding parts and also to align or position the shaft in the desired relative position. Upon the application of a thrust load, the conical portion of the support bearing generates the reactive force required to counteract the applied thrust. The thrust is more effective in the direction of the angle of the cones for three reasons. First, the force closes up the gas pressure gap which in itself increases the thrust pressure in the gas film area itself. The second effect is to decrease the amount of flow into the equilibrium volume on the large surface area cone. This, in conjunction with the relatively small amount of movement allows the gas exhaust area at the large end of the cone to be increased thus providing a combination of two effects which reduce the gas pressure acting on a flat end surface of the cone. This pressure is reduced because of a somewhat smaller gas gap film which does not allow as much pressure into the volume and the increasing exhaust area out of the volume so as to reduce the gas pressure on the end, and therefore causes a reduction of thrust in the direction from which the thrust load is applied. This reduction of thrust therefore increases the thrust counter to the direction from which the thrust loads are applied. This type of bearing assembly can have almost twice the thrust capacity as compared with a conventional gas bearing of the same projected area. On the conical support bearings, the thrust loads are generated by the projected area in an axial direction, while the radial loads are generated by the area projected 90 degrees to the axis.

The bearing system of the present invention may be configured such that all of the air exhausts out of any given port located almost anywhere on the unit. In applications that produce dirt, such as high speed drilling of printed circuit boards, all of the air can be made to exhaust out of the front of the unit, where the shaft protrudes. The exiting air prevents any of the contaminants from getting into the unit and keeps the work area clean. It also allows for cooling of the drill by the exhaust airflow across it.

Where a larger bearing capacity is needed, and therefore bearings which are larger than the armature of the motor which drives the system (the rotor being one part and the housing being the stator), it may be necessary to assemble and reassemble the bearing/armature upon installation. The bearing system design as herein described may be made so that the detachable bearing, if it is damaged by exceeding its capacity, may be replaced relatively simply and inexpensively. Also the support bearings may be easily replaced since they are one piece and are relatively easy to remove. Unlike gas bearings which are of a more integrated design, the bearing system of this invention is of a modular design and only the damaged or worn out parts need be replaced. The modular design of the bearing system of this invention is achieved through the unique suspension of the support bearings on the resilient support elements.

In the case of bearing systems in accordance with this invention in which the support bearings are conical, there is the advantage that only two surfaces need alignment and the system is self-aligning. During operation at high speeds, the stiffness of the gas film of the bearing system of this invention does not have to be as high as in bearings where the spring constant of the gas film constitutes the spring constant of the system. For this reason, the very small orifices required in a conventional gas bearing are not necessary in the case of this invention. The advantage is that it is not necessary to filter the air to the same extent for flow through small orifices.

In the present invention, where the gas film does not have to have as high a spring constant, fewer air supply holes or larger diameters may be used. For example, in most applications, only three to four holes are needed and these may be of relatively large diameter. For example, in one form of bearing system in accordance with this invention which supports a ¾ pound rotor operating at 125,000 RPM, each support bearing has four orifices, larger than 4 mils (0.004 of an inch) in diameter and preferably each in the range of about 0.010 to 0.018 of an inch (10 to 18 mils) in diameter. These relatively large apertures virtually preclude occlusion of the openings by dirt and eliminate the need to filter incoming air with filters which remove all debris above a relatively small diameter. Further, since the bearing system is self-adjusting, the gap dimension varies with operating conditions and thus, there is no need to have the high degree of air filtration needed with some of the prior art systems. The bearing system of this invention is less likely to be damaged by failure of the filtering system.

Since the bearing system of this invention is modularized, different bearing surface materials may be used and interchanged as needed for a particular application. For example, for optimum protection of the support bearing surfaces, should contact be made during operation, the materials for the relatively rotating parts may be selected from a variety of materials. Hard anodized aluminum cones operate well with non-rotating parts such as non-porous graphite composites. High strength alumina oxide cones operating in conjunction with non-porous graphite or carbon composite has non-galling and good wear in the event of accidental contact between the parts. It will be apparent that other materials may be used and that is one of the advantages of this invention.

It will be apparent that the advantages discussed and others will be readily understood by those skilled in the art from the various examples of structures which illustrate the present invention, all of which are best understood from a consideration of the following description taken in connection with the drawings which are presented by way of illustration only and are not to be considered as limiting the present invention.

BRIEF DESCRIPTION OF THE DRAWINGS

FIG. 5 is a view, partly in section and partly in elevation, illustrating a hydrostatic bearing system in accordance with this invention;

FIG. 5a is a view in section taken along the line 5a–5a of FIG. 5;

FIG. 12 is a view, partly in section and partly in elevation, illustrating a hydrostatic bearing system using a large and small conical support bearing resiliently mounted;

FIG. 12a is a sectional view taken along the line 12a–12a of FIG. 12;

FIG. 13 is a view, partly in section and partly in elevation, of a hydrostatic bearing using conical journals and a thrust disc, all resiliently mounted, in accordance with this invention;

FIG. 17 is an enlarged fragmentary sectional view of a bearing system in accordance with this invention which provides vastly increased thrust;

FIG. 20 is a view partly, in section and partly in elevation, of the detailed structure of a gas lubricated gas bearing spindle assembly incorporating the present invention;

FIG. 21 is a plan view of one of the support bearings used in the structure of the present invention; and FIG. 22 is a diagrammatic view of a tilter assembly in accordance with the present invention and which may be used with any of the various forms described.

DETAILED DESCRIPTION OF THE INVENTION

Figure 1:
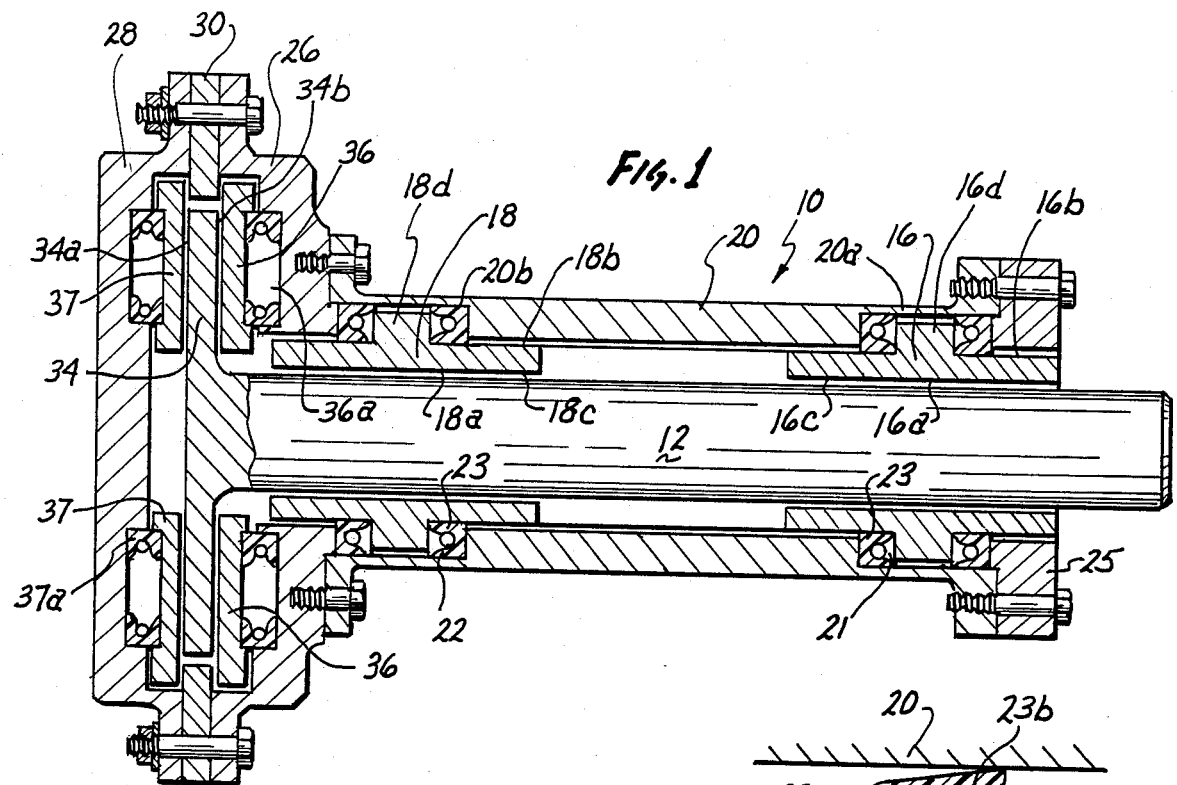
FIG. 1 is a diagrammatic view, partly in section and partly in elevation, of a resiliently mounted hydrodynamic fluid and preferably gas bearing assembly in accordance with the present invention.

Referring to drawings which illustrate various forms and preferred embodiments of this invention, FIG. 1 illustrates diagrammatically a resiliently mounted fluid bearing assembly 10 in accordance with this invention which may be in the form of a hydrodynamic bearing assembly. A shaft 12 (which may also be referred to as a rotor) is radially supported for rotation by at least two axially spaced resiliently mounted support bearings 16 and 18. The shaft may be rotated by any well known means, not shown.

As illustrated, the supporting bearings 16 and 18 are generally cylindrical in shape and surround the shaft 12. The support bearings respectively include an interior cylindrical surface 16a and 18a each o f which extends for some axial distance along the shaft and each being spaced from the outer surface of the shaft so as to form a fluid or gas gap therebetween, as shown at 16c and 18c. The outer surface 16b and 18b of each of the support gearings 16 and 18 are each generally cylindrical and may include an annular radially extending shoulder as at 16d and 18d.

Figure 1A:
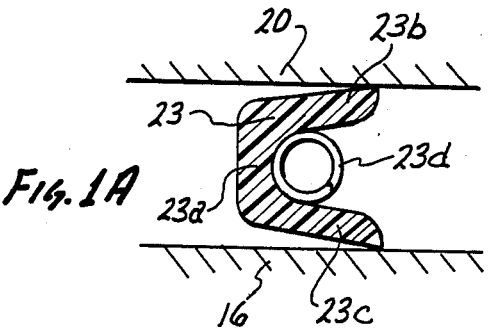
FIG. 1a is a diagrammatic view of the resilient spring mounting assembly for the support bearings in accordance with the present invention.

The support bearings 16 and 18 are received within a supporting structure generally indicated at 20, the latter being provided with generally annular recesses 20a and 20b, as shown. The outer surface portions 16b/16d and 18b/18d of the bearings are in spaced relation to the annular recesses 20a and 20b. The bearings 16 and 18 are resiliently mounted and supported in the supporting structure by resilient mounting means generally designated 21 and 22 positioned between the outer surface portions of the bearings and the associated recesses in the support structure. In the form illustrated, the resilient mounting means is in the form of a flexible spring seal-type of element 23 to be described. In general, these elements are of the type illustrated in FIG. 1a.

Thus, for example, the spring seal element 23 includes a shell 23a having relatively low coefficient of friction inner and outer continuous and radially spaced surface support portions 23b and 23c one of which is continuously in contact with the supporting structure 20 and the other of which has continuously in contact with the bearing, for example 16. To assure resiliency, a spring 23d may be used to urge the support portions apart or in opposite radial directions. One of the advantages of this invention is that various combinations of springs and support portions may be used, with the structure of the spring being designed to produce the desired resilient and flexible mounting of the support bearings, as will be described.

Again referring to FIG. 1, each support bearing 16 and 18 preferably includes two spaced spring elements arranged axially on each side of the shoulders 16d and 18d, as shown, for the purpose of support in an axial direction relative to the shaft. The pairs of spring elements are arranged such that the surface support portions of each spring element is in facing relation to the other, with the inner and outer surface support element contacting the support bearing and the housing, respectively, with the spring element 23d positioned as indicated. The resilient mounting means 21 and 22 are essentially of the same structure as already described.

In the form illustrated in FIG. 1, an end structure 25 is affixed to the housing at one end by bolts or the like and the other end of the housing 20 is affixed to a housing member 26 which in turn is affixed to lower housing member 28 through an annular spacing plate 30. In this form the shaft 12 includes a disk-like thrust pad 34 which is preferably integrally formed with the shaft although other arrangements may be used. It is preferred that the outer surface of the shaft and the outer surfaces of the thrust plate be coated with a high wear material such as pure chrome, tungsten carbide, titanium nitride or titanium carbide, for example.

The thrust pad 34 operates as the surface for providing an axial thrust force capability. In hydrodynamic bearings, the thrust and radial restoring forces are generated by relatively high speed surfaces moving in close proximity with each other and separated by a gas gap. It will be seen that the thrust pad 34 includes a gap 34a and 34b on each side thereof and these gaps are the region in which the restoring pressure force is generated. The analysis of hydrodynamic force generation has been extensively studied and documented. The hydrodynamic force is mainly determined by computer solutions of the Reynolds equations for any given bearing geometry. Reference is made to *Design of Film Bearings*, P. R. Trumpler, McMillan Press, 1966. By this invention, resiliently mounted bearings further enhance the stability and thrust load carrying capacity of the bearing system.

Thus, the support bearings 16 and 18 are resiliently mounted, as described, and operate to generate a fluid restoring force radially. In addition, the thrus pad 34 cooperates with annular disk-like thrust pad bearings 36 and 37, one positioned on each side of the thrust pad 34 and cooperating to form the gaps 34a and 34b. To generate restoring forces more effectively in the axial direction, each thrust pad bearing 36 and 37 is also resiliently mounted by resilient means 36a and 37a. The resilient means may be essentially the same as those described with reference to FIG. 1a, with one surface support portion contacting the associated thrust pad bearing and the other surface contacting the housing member 26 or the lower housing member 28, as shown. The annular spacing plate 30 functions to prevent contact between the thrust pad 34 and the associated thrust bearings 36 and 37 during start up. If the shaft and thrust pad are coated with the materials mentioned it is preferred that the thrust pad bearings and support bearings be made of a ceramic or carbon graphite type material. In this way close tolerance may be maintained with out the possibility of galling or surface destruction if contact is inadvertently made during start up or during running.

One of the aspects of this invention which produces unexpected results is the use of support bearings and thrust bearings which are 360 degree units and either surround the shaft or rotor or are in continuous facing relation to the thrust pad. In large measure the effectiveness of this invention is the relatively rapid response to changing dynamic conditions through the essentially three axis movement of the supporting structure which assures that the gas gap is maintained. This requires both low friction in the relatively moveable parts and a relatively low friction and continuous response rather than a system which must overcome coloumb friction.

The support bearing and thrust pad bearing support system are resiliently mounted and are self-adjusting for maintaining the close distances between the support bearings and shaft, and between the pad bearings and pad to take up thrust loads. Through the use of essentially continuous support and thrust bearings, the adjusting movement thereof is uniform in response, as contrasted to separately mounted support bearings which move essentially independently of each other. By resiliently mounting the thrust and support bearings, each is free to move uniformly such that the entire bearing surface is able to assume a new relative position with respect to the opposed surface. The bearings are thus self-aligning and self-adjusting for maintaining the necessary close spacing between the bearing surface and the opposed surface.

Resilient mounting of 360 degree units also provides for dynamic movement which in turn allows for a damping effect which maintains stability and prevents shaft whirl. The result is that the bearing system rotates about its true mass and the slight amount of friction inherent in the mounting system, in conjunction with the small amount of damping provided by the gas film, is sufficient to maintain a stable system. The use of a 360 degree spring allows for provision of the correct spring constant. The construction of the spring to have the correct spring constant is well known in the art.

Figure 2:
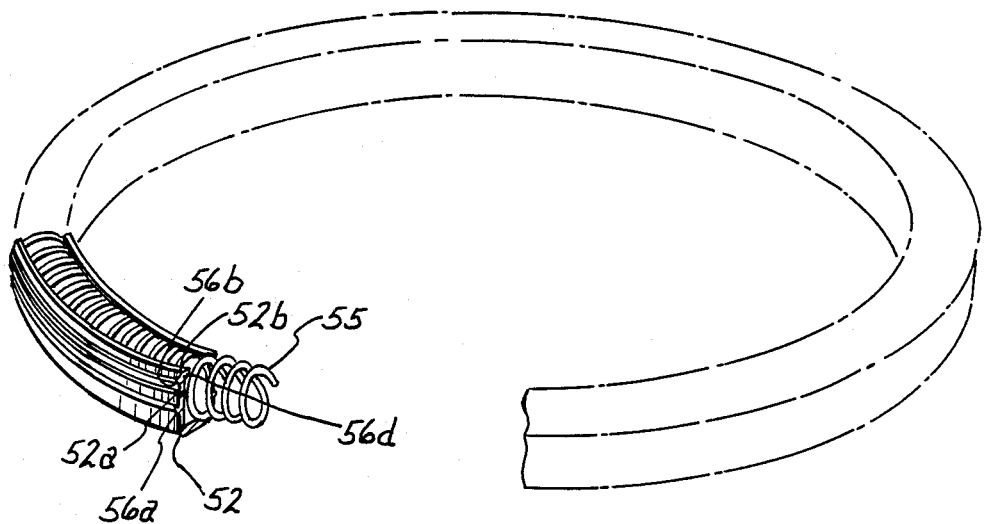
FIG. 2 is a view, partly in section and partly in elevation, illustrating one form of resilient mounting for the support or thrust bearings.

While various forms of springs may be used, for example a 360 degree garter spring which surround the support bearing or is in contact with the thrust bearing, the preferred form of the resilient mounting is a self-energized seal. Referring to FIG. 2, for example, the spring seal 50 includes an outer cover 52 having radially spaced support portions 52a and 52b which are independently flexible. Associated with the cover is a continuous helically wound spring element 55 which functions initially to keep the cover and the spaced support portions energized and expanded against the cooperating surfaces such as the support bearing and the associated housing. The cover may be made of any of a number of flexible materials such as Teflon or glass filled Teflon, carbon or carbon graphite-filled Teflon and the like. In the form illustrated, the spaced support portions include annularly extending seal and support ridges 56a and 56b as shown, with corresponding ridges on the inner surface (not shown), and an inwardly extending lip 56d to assist in maintaining the spring 55 and the cover 52 in the proper relative position.

The spring 55 provides a resilient mount which can be controlled by the design of the spring, that is, how many turns are used and the diameter of the wire. Therefore, this type of spring may be designed to optimize virtually any gas bearing system in accordance with this invention by using the optimum spring constant for the resilient mounts as determined by the gas film spring and the various masses which are being supported. It will be apparent that the resilient mount 50 is a commercially available item, but the size and nature thereof should be selected having in mind the desired spring character needed.

Figure 3:
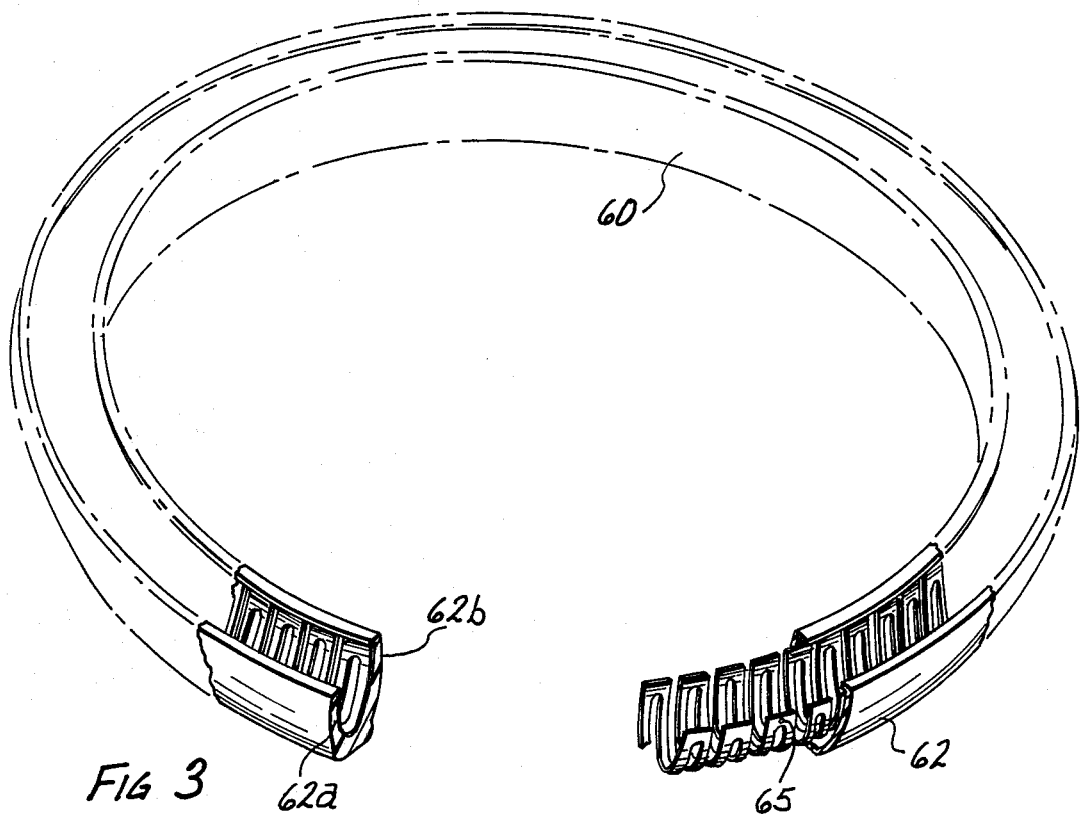
FIG. 3 is a view, partly in section and partly in elevation of another form of resilient mount in accordance with this invention.
Figure 3A:
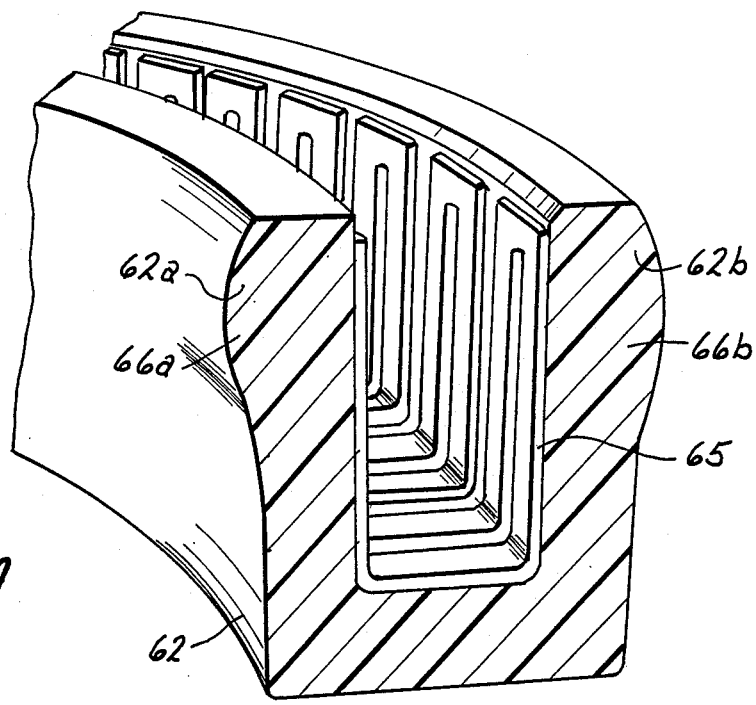
FIG. 3a is an enlarged fragmentary view of the resilient mount illustrated in FIG. 3.

FIGS. 3 and 3a illustrate another form of resilient mounting in the form of spring seal 60 having an outer cover 62 which includes radially spaced support portions 62a and 62b which are independently flexible. Associated with the outer cover 62 is a continuous spring 65 which is in the form of a cantilever spring. The spring 65 may be formed by an etching process or a stamping process and then is pre-bent to a U-shaped configuration as shown. As seen in FIG. 3a, the spaced support portions include portions 66a and 66b which are thicker in cross-section than the remaining portions of the cover. The cover may be of any of the materials already mentioned.

Figure 4:
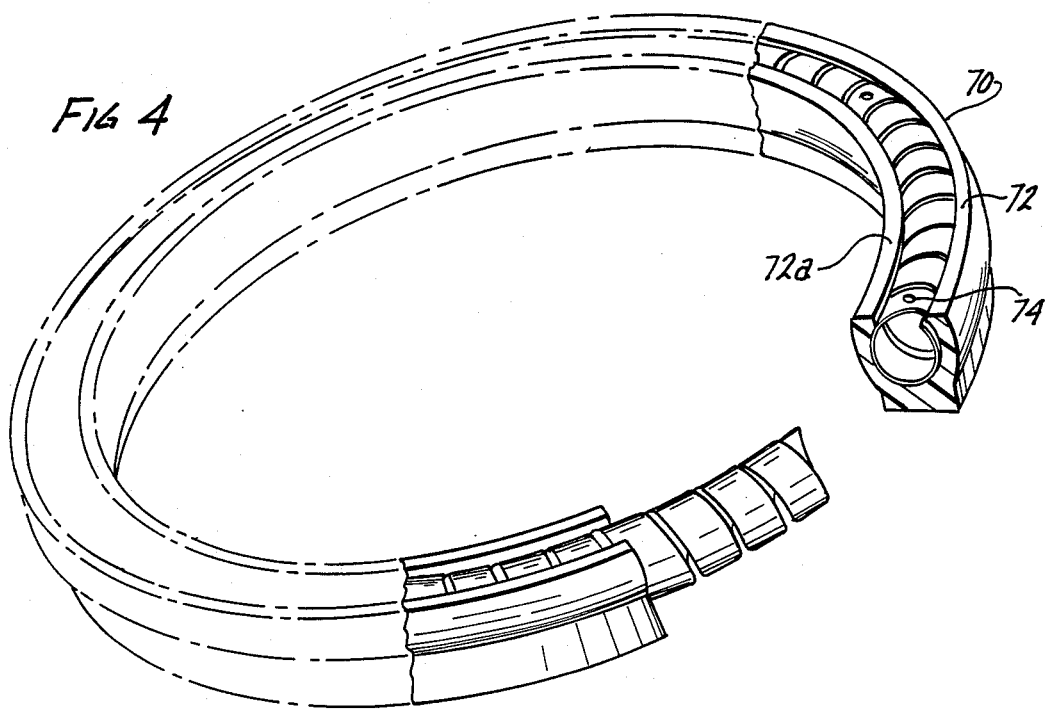
FIG. 4 is a view, partly in section and partly in elevation, illustrating still another form of resilient mount in accordance with this invention.

The form of resilient mounting illustrated in FIG. 4 includes an outer cover 70 which may be of any of the materials described. The cover includes the two radially spaced support portions 72a and 72b and a spring element in the form of a continuous flat strip coil spring 74. It will be apparent that other forms of resilient mounting may be used in illustrated are preferred forms.

FIG. 5 illustrates diagrammatically a resiliently mounted fluid bearing assembly 80 in accordance with this invention which may be in the form of a hydrostatic bearing assembly. A shaft 82 is radially supported for rotation by a least two axially spaced resiliently mounted support bearings 83 and 84. The shaft may be rotated by any well known means, not shown.

As illustrated, the supporting bearings 83 and 84 are generally cylindrical in shape and surround the shaft 82. The support bearings respectively include an interior cylindrical surface 83a and 84a each of which extends for some axial distance along the shaft and each being spaced from the outer surface of the shaft so as to form a fluid or gas gap therebetween, as shown in 83b and 84b. The outer surface 83c and 84c of each of the support bearings 83 and 84 are each generally cylindrical and may include an annular radially extending shoulder as at 83d and 84d.

The support bearings 83 and 84 are received within a supporting structure generally indicated at 87, the latter being provided with generally annular recesses 87a and 87b, as shown. The outer surface portions 83c/83d and 84c/84d of the bearings are in spaced relation to the annular recesses 87a and 87b. The bearings 83 and 84 are resiliently mounted and supported in the supporting structure by resilient mounting means generally designated 90 and 92 positioned between the outer surface portions of the bearings and the associated recesses in the support structure. In the form illustrated, the resilient mounting means is in the form of a flexible spring seal-type of element 93 as already described. The spring seals 93 serve two important functions. They resiliently mount the support bearings 83 and 84 and also contain the gas so as to assure that it enters the bearing interspace through at least one aperture 95.

The radially resilient spring seals 93 are maintained in their respective axial positions by annular spring members 96a and 96b, one located on each side of the spring seals 93, as shown. These springs 96a and 96b are preferably machined axial springs, disclosed for example in my pending application Ser. No. 06/940,948 filed on Dec. 12, 1986 and my earlier issued U.S. Pat. No. 4,640,653 issued Feb. 3, 1987, whose disclosures are incorporated herein by reference. The function of the springs 96a and 96b is to bias the gas pressure in spring seals 93 and to maintain the spring seal in the proper axial position without causing an undue amount of friction induced by said seal elements on the associated support bearings. The axial biasing springs 96a and 96b also allows for complete axial alignment of the support bearings with respect to the shaft 82.

Each support bearing 83 and 84 preferably includes two spaced spring seal elements 93 arranged axially on each side of the shoulders. The pairs of spring elements are arranged such that the surface support portions of each spring element is in facing relation to the other, with the inner and outer surface support element contacting the support bearing and the housing, respectively. The resilient mounting means are essentially of the same structure as already described.

In the form illustrated in FIG. 5, an end structure 100 is affixed to the housing at one end by bolts or the like and the other end of the housing 87 is affixed to a housing member 102 which in turn is affixed to lower housing member 103 through an annular spacing plate 110. In this form the shaft 82 includes a disk-like thrust pad 115 which is preferably integrally formed with the shaft although other arrangements may be used. It is preferred that the outer surface of the shaft and the outer surfaces of the thrust plate be coated with a high wear material, as already described.

The thrust pad 115 operates as the surface for providing an axial thrust force capability. In bearings, the thrust and radial restoring forces are generated by relatively high speed surfaces moving in close proximity with each other and separated by a gas gap. It will be seen that the thrust pad 115 includes a gap 115a and 115b on each side thereof and these gaps are the region in which the restoring pressure force is generated.

Thus, the support bearings 83 and 84 are resiliently mounted, as described, and operate to generate a fluid restoring force radially. In addition, the thrust pad 115 cooperates with annular disk-like thrust pad bearings 116 and 117, one positioned on each side of the thrust pad 115 and cooperating to form the gaps 115a and 115b. To generate restoring forces more effectively in the axial direction, each thrust pad bearing 116 and 117 is also resiliently mounted by resilient means 116a and 117a. The resilient means may be essentially the same as those previously described. The annular spacing plate 110 functions to prevent contact between the thrust pad 115 and the associated thrust bearings 116 and 117 during start up. If the shaft and thrust pad are coated with the materials mentioned it is preferred that the thrust pad bearings and support bearings be made of a ceramic or carbon graphite type material. In this way close tolerance may be maintained with out the possibility of galling or surface destruction if contact is inadvertently made during start up or during running.

As seen in FIG. 5, the housing structure is provided with means to introduce gas into the bearing structure. To this end, the housing is provided with an inlet 120 which communicates with interior passageways 120a and 120b communicating with the apertures 95 and with apertures 95a and 95b in the thrust pad bearings 116 and 117 through passage 120c. The gas exits through an outlet 122.

The resilient mounted thrust pad bearings provide a stable bearing system by providing the means for generating the vibratory motion so that the necessary amount of damping may be effective. This damping is represented by the inherent friction as generated between the seals, their respective housings and the support bearings or thrust bearings. The construction in accordance with this invention allows for excellent alignment between the rotating and non-rotating parts of the bearing system. It also allows for slight movement compensations due to any temperature effects which may tend to alter the dimensional relationships of the system.

One of the aspects of this invention which produces unexpected results is the use of support bearings and thrust bearings which are 360 degree units and either surround the shaft or rotor or are in continuous facing relation to the thrust pad. In large measure the effectiveness of this invention is the relatively rapid response to changing dynamic conditions through the essentially three axis movement of the supporting structure which assures that the gas gap is maintained. This requires both low friction in the relatively moveable parts and a relatively low friction and continuous response rather than a system which must overcome coloumb friction.

The support bearing and thrust pad bearing support system are resiliently mounted and are self-adjusting for maintaining the close distances between the support bearings and shaft, and between the pad bearings and pad to take up thrust loads. Through the use of essentially continuous support and thrust bearings, the adjusting movement thereof is uniform in response, as contrasted to separately mounted support bearings which move essentially independently of each other. By resiliently mounting the thrust and support bearings, each is free to move uniformly such that the entire bearing surface is able to assume a new relative position with respect to the opposed surface. The bearings are thus self-aligning and self-adjusting for maintaining the necessary close spacing between the bearing surface and the opposed surface.

Another feature of this form of the invention illustrated in FIG. 5 is the increase in the desired thrust restoring force of the system, as follows: if the thrust pad 115 moves to the right, as viewed in the drawings, a greater pressure force will be generated in the bearing gap 115a with respect to pad bearing 116. If the thrust plate moves to the left, then a greater force will be generated in bearing gap 115b with respect to pad bearing 117, thus always providing a restoring force. In effect as the surfaces move closer together, a higher gap pressure results since the gas leakage is reduced and more of the higher pressure gas supply is maintained in the gap. In the opposite case, if the surfaces are further apart, there will be greater leakage and lower pressure and thus lower restoring forces.

In general then, gas bearings in accordance with this invention provide a self-restoring force usually in the opposite direction from which any movement, as between the respective surfaces, has occurred. When a resilient mounting is used, this effect is magnified with respect to the total load that any bearing can carry before contact is made between the two surfaces defining the gap and the lubricating region.

Referring to FIG. 5a. There are four resilient self-energized face seals 117a each defining an area 130 which receives lubricating gas through passage 95b. The size of the area 130 is such that in conjunction with the lubricating gas pressure produces balanced pressure forces acting in opposite directions. These pressure fores are generated between the thrust pad bearing 117 and the thrust plate 115 in the region 115b. The area is a function of the bearing system geometry and lubricating fluid pressure. Through the use of resilient mounting of the support and pad bearings in accordance with this invention, the resulting bearing system is dynamically stable and exhibits excellent thrust characteristics while being relatively economical to manufacture. The thrust bearing system design of this invention is also self-adjusting and self-aligning.

Figure 6:
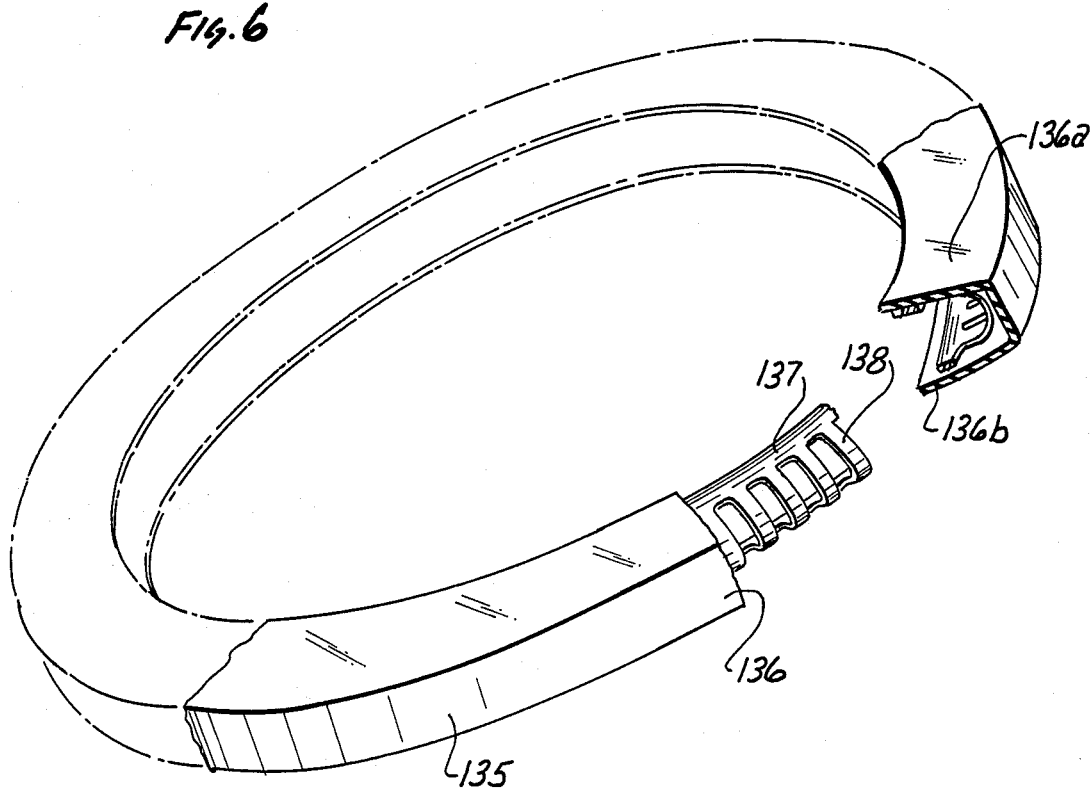
FIG. 6 is a view, partly in section and partly in elevation of another form of resilient mounting in accordance with this invention.

FIG. 6 illustrates another form of resilient mounting in accordance with this invention. The spring seal 135 includes an outer cover 136 having the radial spaced support surfaces 136a and 136b which are flexible, as described. The outer cover is associated with a spring 137 whose function is as already described. Here the spring is U-shaped and continuous and may be made of various spring characteristics depending on the gage of metal and the dimensions of the spaces between the ribs 138. This type of spring seal is especially useful with the bearing system of FIG. 5.

Figure 7:
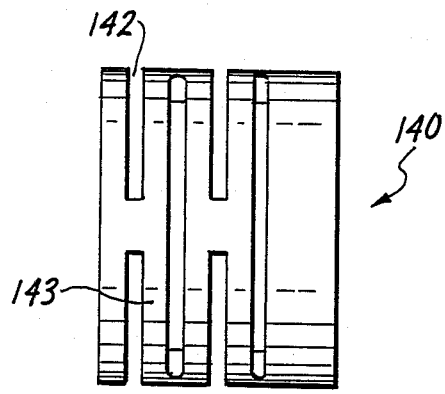
FIG. 7 is a view in perspective of a machined spring for use in accordance with this invention.

FIG. 7 illustrates a machined spring 140 used as already described. The spring includes machined grooves 142 forming leaf like members 143 which together form a complete spring member. A machine type of spring may be formed from a variety of different metals and alloys to obtain the required force versus distance characteristics by control of its dimensions, as is well known in the art. For example the diameter of and the thickness of leaf member 143 can be varied to obtain different characteristics. Machined type springs are especially suited for use in the present invention since the are symmetric and allow almost perfect alignment of the support bearings with respect to the rotating shaft or rotor.

Figure 8:
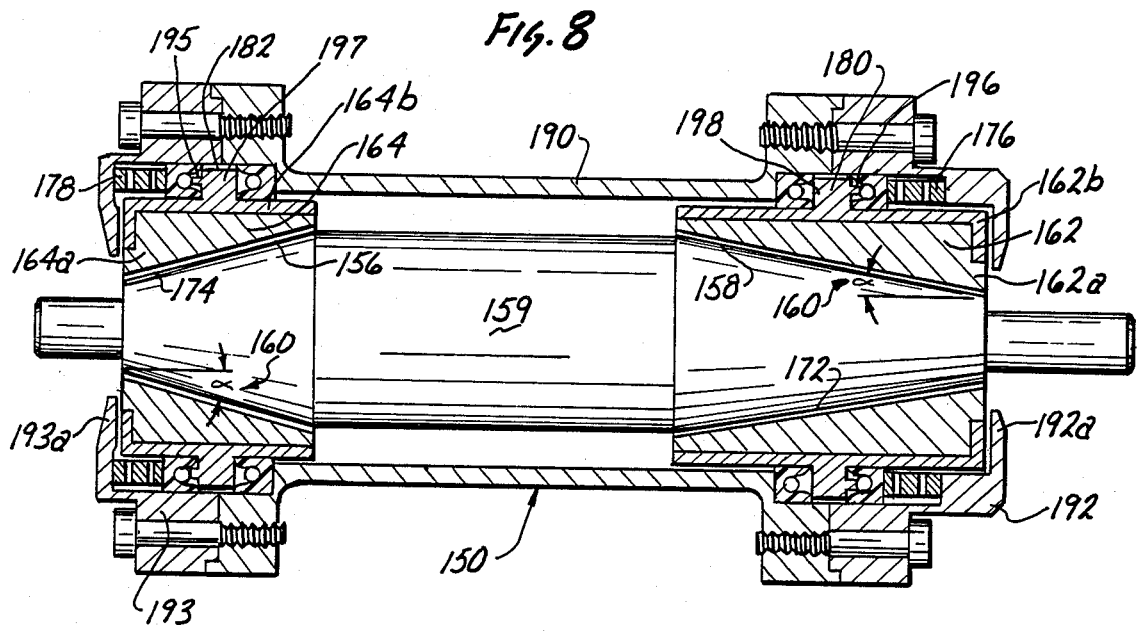
FIG. 8 is a view, partly in section and partly in elevation, of a hydrodynamic bearing in accordance with the present invention in which conical support bearings are used.

FIG. 8 illustrates a hydrodynamic bearing 150 with conical journals 156 and 158 on the ends of a rotor 159. The journals have different half angles as indicated at 160 thus providing for a greater stiffness on one end than the other. Such a configuration is preferred in order to provide sufficient radial load carrying capacity along with the required thrust load capacity. By using a differential taper, a greater surface area is provided which has a greater radial load carrying capacity. In the form illustrated, the surface area of the conical support bearing 162 is greater in area than that of the conical support bearing 164 and this operates to provide a greater radial support. The thrust capability of this form is provided by the projected area of the conical support bearing with respect to the axial direction.

In most cases this projected area should be the same for each journal to assure axial stability of any given bearing system. In some cases, if the projected area is not quite the same, different pocket configurations or inlet orifices may be used to compensate for differences in these projected areas. Since this form is a hydrodynamic bearing system (that is, it generates its own pressure restoring forces in the areas 172 and 174), the conical configuration and the axial springs 176 and 178 maintain the optimum spacing in film 172 and 174 for generating maximum pressure forces at any given RPM. The axial springs 176 and 178 are preferably machined springs of the type described for the reasons described.

In order to assure maximum dynamic stability, the conical bearings are supported by resilient support and seal assemblies 180 and 182, each including a double seal member as already described, i.e., to allow radial and angular movement. Gaps 172 and 174 are formed by the space between the conical journals 158 and the conical support bearing 162 and 156 and 164. The machined springs 176 and 178 cooperate with the associated resilient mounting to provide the axial thrust capability as described.

The conical support bearings 162 and 164 may be made from one piece or may be manufactured such that good bearing material 162a and 164a is contained in a metallic housing 162b and 164b, as shown. The bearing material may be any of the materials already described so as to prevent galling if incidental contact is made at high rotary speeds. Coatings such as those already described may also be used. As previously described the resilient mounting means and axial springs for the conical support bearings are in turn supported by a housing 190 which is turn is affixed to end structures 192 and 193 each having circular and radially inwardly extending flanges 192a and 193a, each spaced from the end face of the associated bearing so that the latter may move in the manner indicated and as needed. The end structures are affixed to the housing by bolts as shown.

Figure 8A:
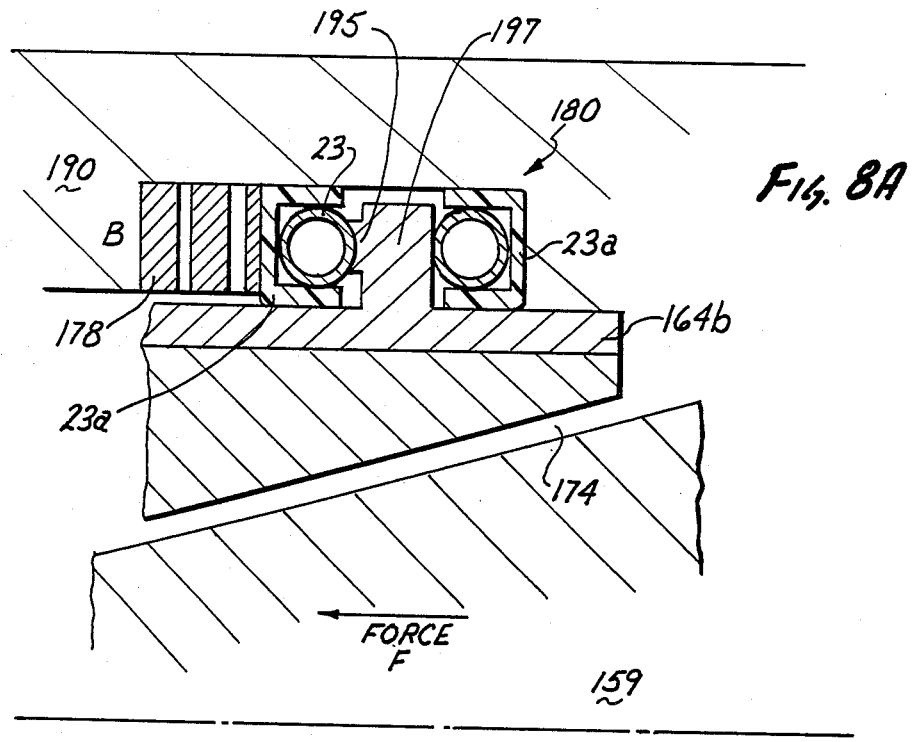
FIG. 8a is an enlarged fragmentary view, partly in section and partly in elevation, of a portion of the resilient bearing support system illustrated in FIG. 8.

Referring to FIGS. 8 and 8a, the axial or thrust loads are counterbalanced by the force transmitted through annular oppositely and outwardly facing projections 195 and 196 which extend axially and which are provided on each of the annular shoulders 197 and 198 of the metallic housings 162b and 164b, if such are used to contain the bearing material. If the support bearings are made of one piece the shoulders may be formed on the support bearings. The force is counteracted and maintained by the axially disposed machined springs 176 and 178 so as to maintain the support bearings 162 and 164, as well as the conical journals 156 and 158 in the correct relative spacing with respect to the housing.

As shown in FIG. 8a, the support bearing suspension system includes resiliently and radially supported spring seal assemblies as already described. The spring seals are composed of the inner spring element 23 and shell elements 23a as previously described in connection with FIG. 1a or the remaining spring seals already described. The spring seals allow for axial motion of the associated support bearing. The thrust restoring force, which is the reaction to force F, is transmitted to the housing 190 via the annular projection 195 which is transmitted from the spring 23 through the shell 23a and then to the axial spring 178 to the housing 190 as indicated at B. Essentially the same action takes place in the other support bearing structure, but in an opposite direction.

Figure 8B:
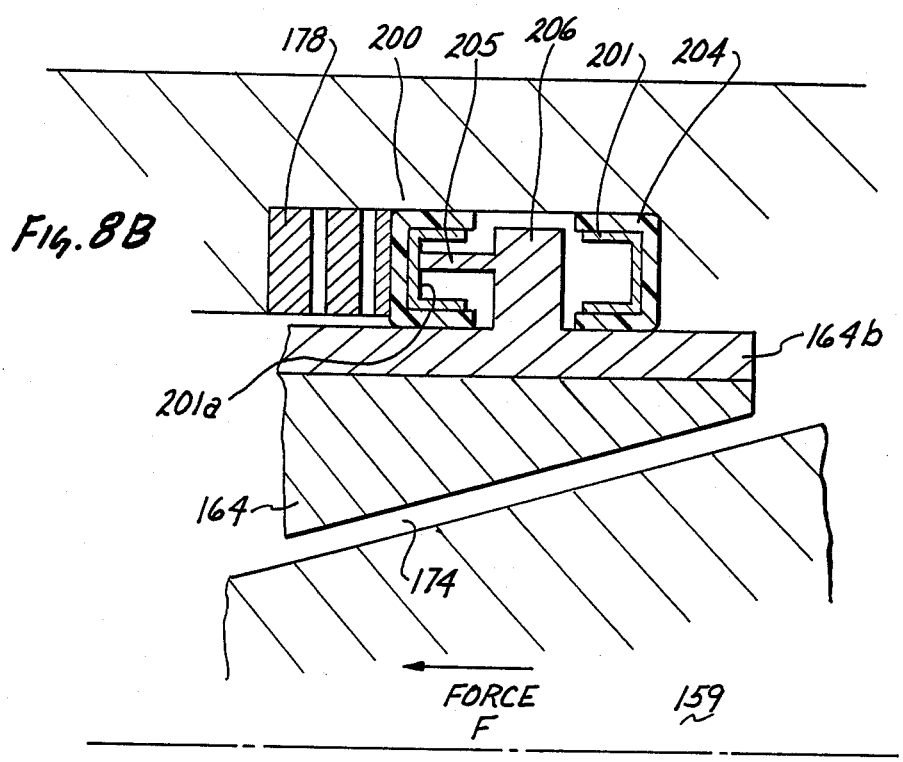
FIG. 8b is an enlarged fragmentary view, partly in section and partly in elevation, of another form of a resilient bearing support system useable with the structure illustrated in FIG. 8.

FIG. 8b illustrates a modification of the structure shown In FIGS. 8 and 8a in which the spring seal assembly 200 may be of the type illustrated in FIG. 2 or 3a in that the spring element 201 may be similar to 55 or 65. The outer cover 204 may be as previously described. In this form the annular axially extending projection 205 on the shoulder 206 of the support bearing 164 contacts the inside face 201a of the spring as indicated. The support bearing 164 transmits the thrust load F through the projection 205 and simultaneously through the spring 201 and cover 204 into the axial machined spring 178.

One of the important aspects of this invention is that the support bearings are free to move axially in order to compensate for thermal expansion, lubricating fluid pressure changes and thrust load changes. The use of axially disposed machined springs 178 to bias the axial seal forces provides a system which has a minimum of axial frictional forces. This is important since the axial friction force magnitude effectively determines the repeatability and consistency of maintaining the desired optimum support bearing and shaft journal bearing clearances. It is for this reason that the shells, e.g. 23a and 204 are fabricated from the materials having a relatively low coefficient of friction, as already described. It should also be noted that most of the relative seal movement as between the seals and the bearings occur on the outer peripheral surface of the shells. This resilient mounting and lip-type contact affords a minimum line type of contact so as to further minimize the axial frictional forces.

Figure 9:
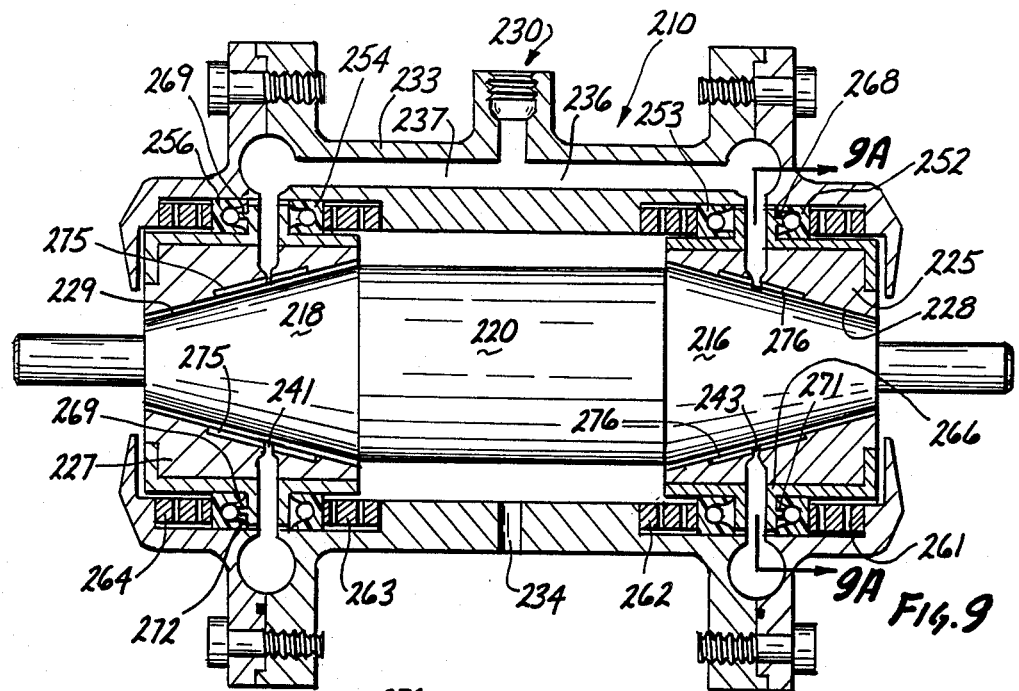
FIG. 9 is a view similar to FIG. 8 illustrating a hydrostatic bearing in accordance with this invention.

The hydrostatic bearing system 210 of FIG. 9 essentially eliminates all axial frictional forces. In this form conical journals 216 and 218 are provided on the shaft or rotor 220 and cooperate with axially spaced support bearings 225 and 227, there being a space or gap 228 and 229 between the cooperating support bearings and journals, as indicated. The pressurized lubricating fluid, preferably a gas, enters through an aperture 230 provided in the housing 233, and exits at 234 and flows through the housing channels 236 and 237 and into the spaces or gaps 228 and 229. In this form, the support bearings are provided with apertures 241 and 243, as shown, which communicate with the channels 236 and 237.

The pressurized fluid is prevented from leaking by self-energized spring seals 252, 253, 254 and 256, each of a type already described. These spring seals also provide a resilient radial support mounting for the associated support bearings 225 and 227. The pressurized fluid tends to urge the spring seals apart and are retained by axial spring members 261, 262, 263, and 264 which are in the form of machined springs, as already described. These machined springs, which act as retaining springs, assist in providing the proper clearance in the gaps 228 and 229 while providing an almost perfect alignment between the support bearings and the journals. Since the springs are machined springs, their action is essentially uniform as contrasted to a coil spring. Since these springs are flexible along their length, they allow the individual components to align themselves so as to balance the pressure forces.

Axial thrust load capability is provided by the conical design of the journal and support bearings and the axial thrust load is counteracted by the axial thrust springs 261–264. The axial load is transmitted from the support bearings 225 and 227 through an annular ring 268 which is integral with the associated support bearing and which faces the seal 252 and another ring 269, similar to 268, which faces the seal 256. The spring seals are retained by the machined springs which in turn are restrained by the housing 233. The axial retaining springs also allow for compensation in response to shock loads. The annular rings include annular axially extending projections 271 and 272 through which the axial loads are transmitted, as already described in connection with the prior figures.

Since a resiliently mounted bearing is inherently more stable than a non-resiliently mounted system, pocketed support bearings may be used. Orifice-fed pocket support bearings produce considerable more restoring force than the same support bearing without pockets, since the pocket structure produces greater pressure forces. However, these pocket bearings are much less stable and tend to produce unwanted vibrations. These vibrations are known by various names such a pneumatic hammer and self-excited resonance. If resilient mounted bearings are used, pocket-type bearings can be used and still maintain stable systems, thus producing a better overall bearing assembly.

Figure 9A:
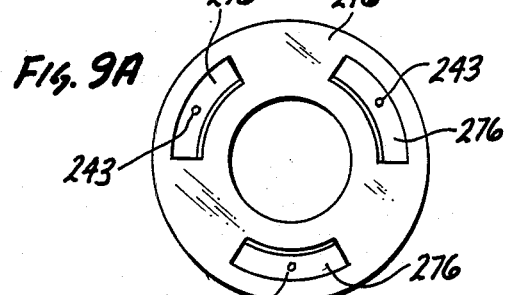
FIG. 9a is a section a view taken along the line 9a–9a of FIG. 9.

The reason that pneumatic hammer occurs is due to a finite time constant associated with gas lubricated bearings. That is, with gas bearings it takes time for the bearing to adjust to a change in shaft position and this lagging time leads to unstable vibrating systems. This instability occurs in bearings in which the gas is fed through a small feed hole into a pocket of relatively large volume. Under conditions of static equilibrium, the flow through the feed holes 241 and 243 is equal to the flow out of pockets 275 and 276, see also FIG. 9a associated with each of the support bearings. In the form illustrated there are three feed holes and three spaced and arcuately shaped pockets in each support bearing, as seen in FIG. 9a.

The pocket pressure is controlled by the flow through the feed holes and adjusts automatically to changes in the support bearing and journal relative position due to bearing loads. If, for example, the load is increased the opposed faces of the support bearing and the journal move closer together, i.e., the gap closes, and the flow through the feed hole is reduced. The pressure drop across the feed hole is also reduced so that the pocket pressure rises nearer to the gas supply pressure. However, in order for the pocket pressure to adjust quickly to changes in gap dimension or clearance, the pockets must be of a small volume. A pocket of large volume takes longer to fill and to empty, so that pocket pressure reacts sluggishly to changes in clearance. The changes in pocket pressure can lag to such an extent (a large time constant) that, following a random disturbance from an equilibrium position, an oscillation of increasing amplitude is generated which produces an unstable vibrating system. Resiliently mounting the support bearings, as described in connection with this invention, allows the use of pocket bearings without the above noted instability problems.

Pneumatic hammer is caused by a lagging time constant associated with the volume of the gas film, while self-excited resonances are caused by the fluid flow phenomenon such as shock waves with a gas or cavitation with a fluid. Due to the self-adjusting feature of the structure of this invention, the bearing system of this invention can allow for very small clearances during all phases of bearing operation. These small clearances tend to keep any fluid flow in a laminar state, which tends to prevent any shock waves, and minimizes the self-exciting type of resonances.

Figure 10:
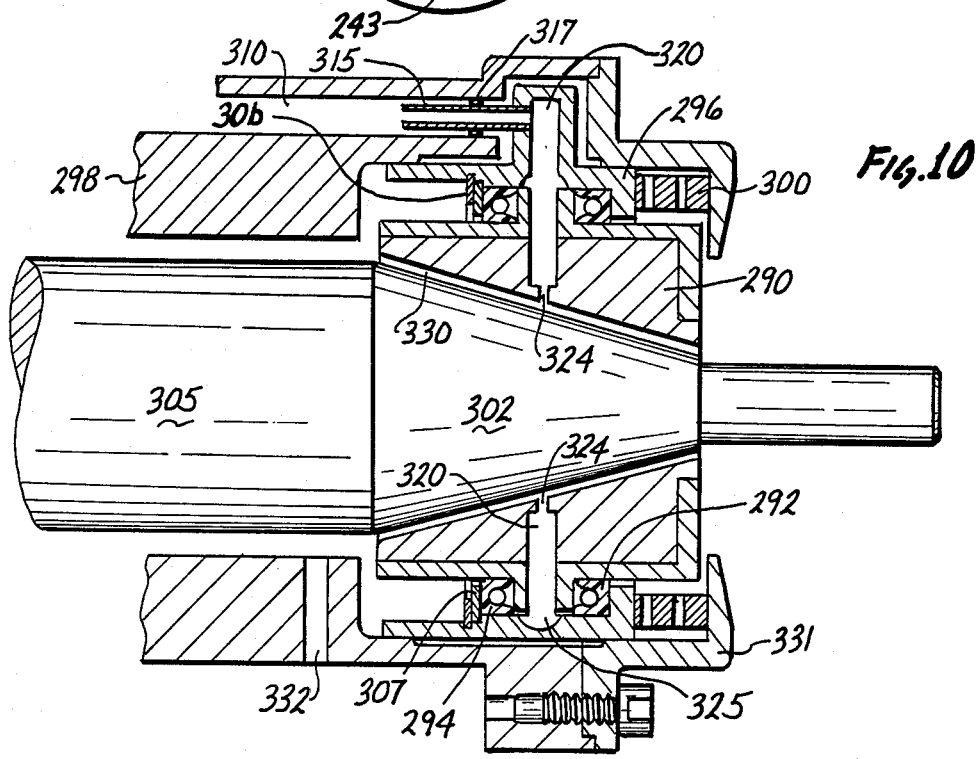
FIG. 10 is a fragmentary view, partly in section and partly in elevation, of a hydrostatic bearing in accordance with this invention which essentially eliminates almost all of the axial frictional forces.

FIG. 10 illustrates another form of bearing system in accordance with this invention in which the support bearing 290 is resiliently mounted by self-energized spring seals 292 and 294 which are contained in an inner bearing housing 296, the latter being supported in the main housing 298. The inner bearing housing is moveable axially with respect to the main housing. Associated with the inner housing 296 is a axially disposed machined spring 300 which counteracts the thrust load produced by the conical journal 302 on the shaft or rotor 305.

Radial movement is provided by the resilient self-energized spring seals 292 and 294 which may be of any of the types already described. The spring seals are retained in the inner housing by a washer 307 and a washer retainer 308 which may be a snap-ring.

Pressurized fluid enters through an opening in the main housing similar to 230 (FIG. 9) and enters passageway 310 in the main housing to enter a tube. 315 mounted on and carried by the inner housing 296. The tube, of which there may be several, is sealed to the outer housing by an O-ring 317. Fluid then flows through a radial passageway 320 which communicates with an orifice 324 in the conical support bearing 290. In the form illustrated, there is one tube 315 which feeds an annulus 325 which effectively forms a manifold for several passageways for several radially spaced orifices. Pressurized gas flows from the orifices to the clearance or gap 330 between the support bearing and the journal.

In this form of the present invention, the only axial frictional forces are those which result from the small inlet tube 315 and the O-ring seal 317 and for this reason it is desirable to use the manifold arrangement described with only on inlet tube. The structure of this form results in a gas bearing in which the assembly is more tolerant of axial position variations due to thermal expansion and thrust load changes. The axial friction forces due to the self-energized spring seals are essentially completely eliminated because there is no relative axial motion of the spring seals with respect to the support bearing. The complete support bearing mounting system, including the support bearing 290, the spring seals 292, 294 and the inner housing 296 move as a unit in the axial direction thus eliminating essentially all of the axial friction forces.

The thrust forces are biased by the axial spring 300 which is contained by end cap 331. In this form of the invention, the axial springs 300 are designed specifically to match the axial loads produced by the conical type design which in turn is designed to withstand any of the external thrust forces applied to the total bearing system. Near perfect alignment is maintained by the axial fit of the inner housing 296 with respect to the main housing 298, the latter including an exit port 332 for exit of the pressurized fluid. If desired, a pocket type support bearing may be used, as previously described.

The basic structure illustrated in FIG. 10 may also be used as a hydrodynamic bearing in which the gas film forces are generated by rotation of the journal within the support bearing. In the hydrodynamic type of bearing, the inlet passages and entry orifices are naturally eliminated. Various gas film region surface geometry my be used such as pockets with steps or herringbone configurations, in order to obtain the most efficient and a higher load carrying hydrodynamic bearing. The structure of FIG. 10 may also be used in conjunction with the type of bearing illustrated in FIG. 9, one on each end of the shaft. So modified, the structure allows for free axial adjustment due to the self contained inner housing structure shown in FIG. 10 while maintaining the axial position of the main housing.

Figure 10A:
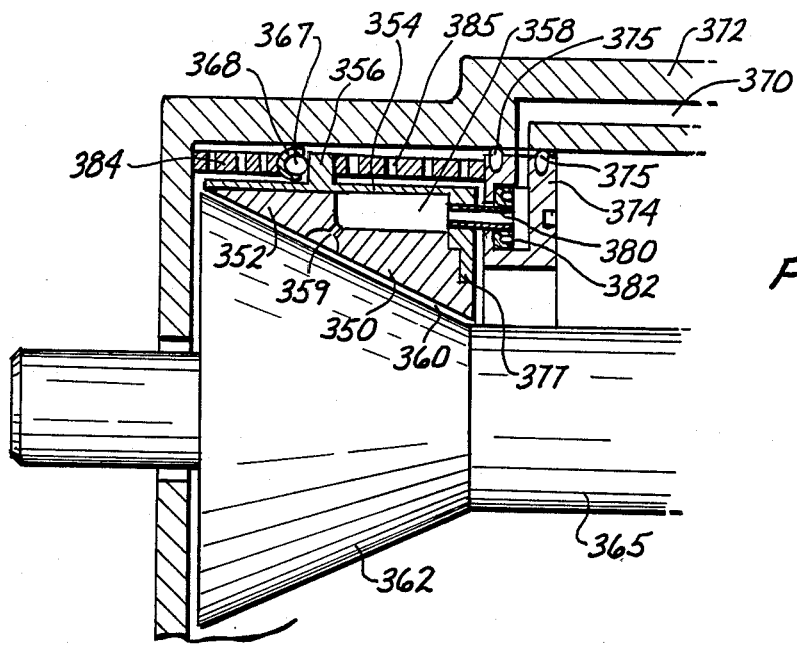
FIG. 10a is a fragmentary sectional view of a hydrostatic bearing in accordance with this invention using a hollow shell member which is pressurized by a tube.

The structure illustrated in FIG. 10a is again one which provides for a minimum of axial friction. In this form the support bearing 350 is in the form of a hollow member formed of bearing material 352, as already described, mounted in a housing 354, the support bearing face being conical as illustrated. The housing includes an annular projection 356 and an annular chamber 358 is provided with passageways 359 for flow of pressurized fluid to the gap 360 formed by the face of the support bearing and the opposed conical face of the journal 362 which is on the shaft or rotor 365. The support bearing structure is mounted in a resilient support structure composed of a radial spring 367 encased in a relatively low friction shell 368, the mounting permitting radial movement of the support bearing. The spring and shell may be of the type described.

Pressurized fluid enters through inlet 370 in the housing 372 and flow to a stationary manifold 374 sealed to the housing by two O-ring seals 375. The rear face of the support bearing structure includes a plate 377 sealed to the housing and bearing proper and the plate carries a tube 380 which protrudes axially into the manifold 374. The tube 380 is sealed to the bearing and the manifold by small self energized seal rings 382 which may be as already described.

Cooperating with the resilient spring system is an annular cylindrical spacer 384 which keeps the shell 368 and the spring 367 axially positioned while axial machined spring 385 is positioned between the projection 356 and the manifold 374. The axial spring 385 biases the axial forces on the support bearing by the gas forces in the gap 360, the annular projection 356 being proportioned to fit closely in the housing 372 to allow sufficient radial motion to assure proper support bearing function and at the same time to position the support bearing and journal in the center of the housing. This form of the present invention provides for minimal axial friction since the main radial springs 367–368 are not pressurized. Seal 382 which is pressurized by the pressurized fluid minimizes the axial friction forces on the support bearing structure because the seal is comparatively small since the seal 382 only seals the tube 380 which is moveable axially and radially with respect to the housing.

Figure 10B:
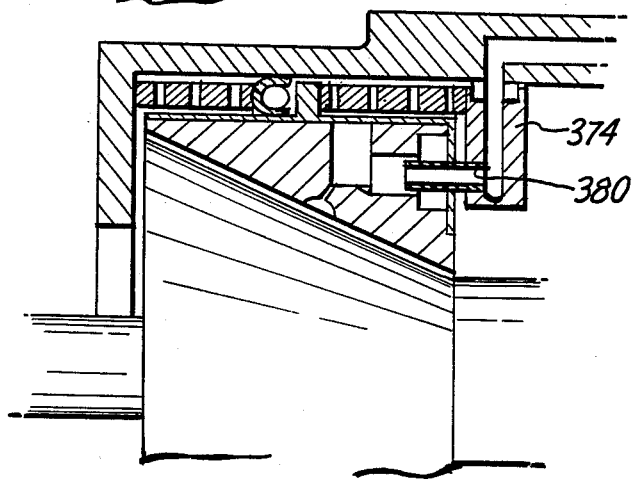
FIG. 10b is a fragmentary sectional view of a bearing system in accordance with this invention using a hollow shell with an inlet tube fixed to a manifold.

In the form illustrated in FIG. 10b, the tube 380 is carried by the manifold 374 while the seal 382 is mounted on the support bearing structure.

Figure 10C:
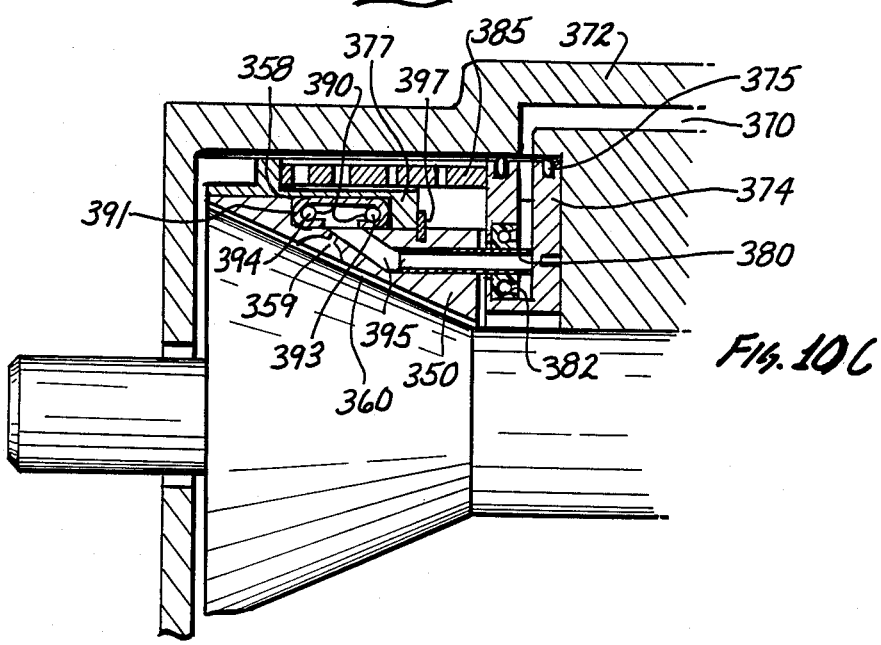
FIG. 10c is a fragmentary sectional view of another form of bearing system in accordance with this invention using a hollow shell whose inner chamber is sealed by a double-ended self-energized spring seal.

FIG. 10c illustrates another form of bearing system in accordance with this invention using another form of spring seal arrangement. The same reference numerals will be used as in FIG. 10a for the common parts. In this form the chamber 358 includes double ended self-energized spring seal assembly 390 in which the relatively low friction shell 391 is expanded by two springs 393 and 394. The use of a double ended type of seal eliminates axial forces due to gas pressure within the seal member and also prevents leakage of bearing fluid out of the bearing shell except through orifices 359. In this form, fluid flows into the manifold 374, through tube 380 and through passageway 395 and into chamber 358 to expand the double ended seal. A snap ring 397 is used to retain the member 377 to the bearing body 350.

Seal 382 for the tube 380 is much smaller than seal 390. Axial forces and motion of the support bearing due to gas film pressure in the gap 360 is biased by axial spring 385. This form is similar to those previously described in which a relatively small seal element is used on the tube 380. Essentially the only axial friction is that caused by friction between the seal 382 and the tube 380 which is firmly fixed to the bearing shell 350. The slight relative radial movement required between the support bearing and the housing is allowed by the radial flexibility of the springs 393 and 394.

Figure 11:
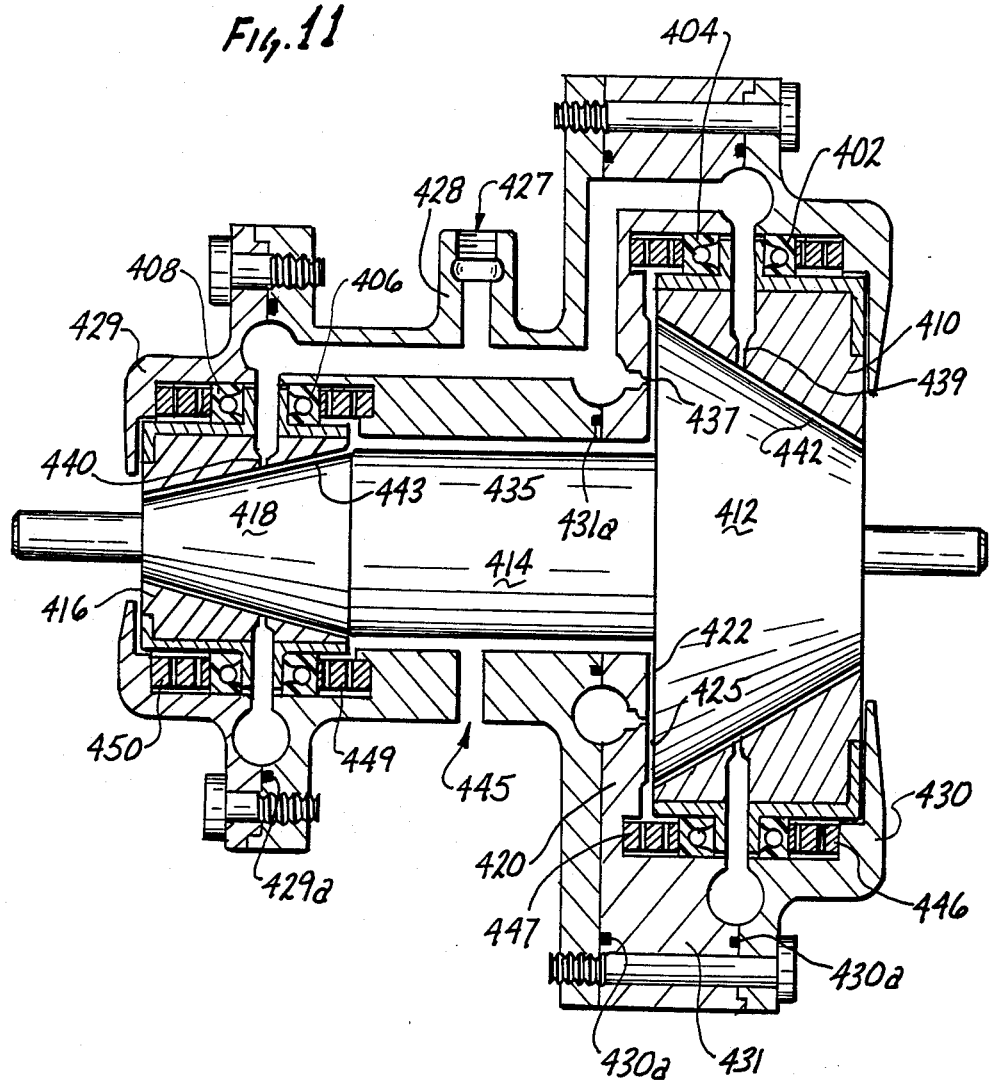
FIG. 11 is a view, partly in section and partly in elevation, of a bearing system in accordance with this invention using conical support bearings resiliently mounted.

The bearing system illustrated in FIG. 11 uses two different sizes of conical support bearings and journal bearings, the support bearings being resiliently mounted on self-energized spring seals 402, 404, 406 and 408 whose structure has already been described. One of the conical support bearings 410 and the associated conical journal 412, mounted on the shaft 414, is larger than the other conical support bearing 416 and the associated journal 418. This particular structure provides for greater thrust capability by the use of a stationary radially disposed thrust pad 420 and a rotating radially disposed thrust surface 422 provided on the journal 412, thereby creating a thrust producing region 425 between the opposed thrust pad and thrust surface.

The thrust producing region is provided with pressurized fluid, which enters inlet port 427 positioned in the center housing section 428. The center housing is affixed to an end housing 429 and sealed thereto, as indicated at 429a, while the other end of the housing is affixed to the other end housing 430, through a spacer housing 431, each sealed as indicated at 430a and 431a. Pressurized fluid flows from the inlet 427 through passageway 435 into inlet orifices 437 to the thrust producing region 425. Pressurized fluid also flows through orifices 439 and 440 in support bearings 410 and 416 and into the associated gaps 442 and 443. The pressurized fluid exits through outlet 445.

Support bearing 410 is resiliently mounted and its axial thrust forces are biased by axial machined springs 446 and 448 which also allow for the needed radial movement. Support bearing 416 is also resiliently mounted and machined springs are used, as described. The orientation of the bearings is such that the cones are in facing orientation, as shown. While this structure is a hydrostatic bearing, it is understood that with the appropriate strength springs and correct surface geometry, it may be used as a hydrodynamic bearing. The particular structure described offers the advantage of greater thrust capability through the use of a thrust surface while retaining all of the advantages of a resiliently mounted support bearing and the self-adjusting features of conical support bearings and journals.

The structure illustrated in FIG. 12 is similar to that of FIG. 11 and the same reference numerals have been applied to the same parts. The form illustrated in FIG. 12 has greater side load capacity, as will be described.

In the form of FIG. 12, the conical journals 460 and 462, the latter being the smaller and referred to as the "tail" bearing and the former being the "main" bearing, and the associated support bearings 464 and 465, are arranged such that the cones open in the same direction. The tail bearing operates to keep the rotating shaft or rotor 414 aligned while the larger bearing resists side loads Fs and thrust loads Ft. This form has greater side load capacity since the restoring force Fr acts in the direction of the conical angle of the larger bearing and has a greater fulcrum than the structure of FIG. 11. A thrust bearing area 470 formed between the end face of the main journal bearing 460 and thrust pad 473 provides the required thrust force to stabilize the rotor 414 in its desired transverse position by counteracting the thrust produced by the main journal bearing 460. Reference is also made to FIG. 12a illustrating the thrust pad area 470, the orifices 474 and associated passages 474a. The orifices 474 permit flow of pressurized fluid through passages 475 in the end housing 476 which is affixed and sealed to the spacer 431.

In the form of FIG. 12, machined springs 446 and 449 function to maintain the resilient self-energizing seals 402 and 404 in their correct position against the axial spring thrust produced by the pressurized fluid in the gap 441. By retaining the seals 402 and 404 in their respective axial positions by the machined springs, the result is that static friction is minimized as between the seal and the main support bearing 474 so that the system is self-adjusting and will maintain the optimum clearance between the journal 460 and the support bearing 474 in the gap area 442. The main support bearing includes a machined spring 480 which provides the axial force for maintaining the main support bearing axially resiliently in the desired position.

As noted, the resilient self-energizing seals operate to support the support bearings resiliently with respect to the housing, to maintain the support bearings concentric with respect to the housing and to contain and direct the pressurized fluid while allowing the bearing system to be mobile and thus self-adjusting to keep the desired gap clearance.

In operation, the resilient self-energized seals are forced against their respective retaining springs by the pressurized fluid. If there is a fluctuation in fluid pressure, it is desired to have the support earing move and adjust so as to maintain the optimum fluid film thickness in the gap 442. If both seals 402 and 404 are retained by a solid member in place of retaining springs 446 and 447, they would not be able to move axially with respect to the housing and their static friction would adversely affect the axial movement of the support bearing 474. Due to the static friction between the seals and the support bearing, complete freedom of axial movement of the support bearing would not be possible unless the seals are retained by the springs 446 and 449.

Since the seals are retained by springs, they are free to move if a pressure fluctuation takes place. Both seals move towards each other with a decrease in pressure, or both seals move away from each other with an increase in pressure. The motion of the seals is always opposite and equal and thus the static friction of one seal on the support bearing cancels the static friction of the other seal. In this way almost complete freedom of axial movement of motion is obtained without the effects of static friction. In this way, one always obtains the correct adjustment to ensure the correct film thickness in the gap 442 upon start-up by eliminating the effect of friction due to friction of the seals. The main journal bearing axial spring 480 is thus used to bias the gas pressure forces caused by the external axial force Ft on the bearing 464 and transmitted through the gas film 442

If the static and dynamic friction of the shell used in the seal shell is essentially the same as is the case with TEFLON or other types of relatively low coefficient of friction materials, typically fluorocarbons, it is possible to use only one seal retaining spring for each support bearing. That is, seal retaining spring 446 can be replaced by a solid cylindrical member with only axial spring 449 being used. This form of the invention will also eliminate most of the detrimental effects of static friction from affecting the self-adjusting features of the support bearing 464. If there is an increase in fluid pressure, support bearing 464 will tend to move to the left as seen in the drawings. The friction of seal 402 held axially stationary of the solid cylindrical member will tend to retard the motion of the support bearing 464. However, seal 404 will move to the left as seen in the drawings due to the pressure increase, since it is retained by the resilient retaining spring 449. This motion will tend to cause support bearing 464 to move to the left, thus counteracting the friction caused by stationary seal member 402. In like manner, the same self-counterbalancing frictional forces will operate if there is a decrease in the pressure of the pressurized fluid. It should also be apparent that only one retaining spring has to be axially resilient and it has to be the member in the direction in which the support bearings 474 has to move if there is an increase in fluid pressure, i.e., axial spring seal 447 which is located at the smaller diameter end of the cone of support bearing 464.

It is also apparent that all of the description referring to the right support bearing 464 and related support structure is applicable to the left support bearing and support structure.

By way of example and not to be construed as a limitation of the present invention, the following specific example illustrates how, by axially mounting the support bearing 464 with axial support spring 480, the thrust capacity may be substantially increased. The following actually measured bearing characteristics illustrate the almost doubling effect of the thrust capacity of a 28 degree cone angle bearing having an outside diameter of 1.5 inches and using air (non-purified or dehumidified or chilled) at a pressure of 70 PSIG. The maximum thrust load which may be supported by the support bearing 474 in conjunction with journal 460 is 80 pounds at zero fluid film thickness in the gap 442.

The given gas spring constant is 50,000 pounds per inch which means that around an operating gap of 0.0004 of an inch, support bearing 464 will exert a force of 60 pounds to the right as viewed in FIG. 12, while thrust bearing 473 will counter with a force of 60 pounds to the left (0.0004 times 50,000=20 pounds; thus 80 pounds, the maximum force at zero clearance, less 20 pounds=60 pounds). If a thrust of 40 pounds is applied at Ft, the journal 460 will touch at 442 if spring 480 is replaced by a solid member. If spring 480 is assumed to be solid, i.e., not axially resilient, then if a force Ft is applied so that a 0.0004 of an inch motion of the shaft 414 occurs to the left, the force between support bearing 464 main journal 460 in the gap 442 will be 80 pounds to the right. Likewise the force occurring to the left by thrust bearing 473 will drop from 60 pounds to 40 pounds. Thus the maximum thrust force capacity is 80 pounds to the right less 40 pounds to the left, producing a maximum thrust capacity of 40 pounds counteracting Ft. If spring 480 is assumed to have a spring constant of 17,000 psi, a greater thrust capacity is obtained. The explanation is as follows.

Since support bearing 464 has a maximum thrust capacity of 80 pounds in the equilibrium position with an Ft of zero, the bearing forces are 60 pounds. This produces a differential force of 20 pounds. This force in conjunction with the 17,000 psi spring constant will cause a movement of 20/17,000=0.001176 of an inch of support bearing to the left as seen in FIG. 12. This movement will cause a decrese of 0.001176×50,000=58.82 pounds of thrust between thrust bearing 473 and the face of journal 460 in the gap 442. The net thrust to the left due to the fluid forces in the region 470 is 60−58.82=1.17 pounds. The total thrust capacity is therefore 80−1.17=78.82 pounds to the right to counteract Ft. Thus, by using a spring at 480, which has a spring constant of 17,000 psi, the thrust capacity of the structure can be increased from 49 pounds to about 79 pounds, about double as compared to a common non-resilient type of bearing structure. This added thrust capacity is also obtained in a self-adjusting bearing system which provides the various degrees of freedom already noted.

The form of the invention illustrated in FIG. 12 lends itself to a one piece solid type of rotor which exhibits little, if any, shifting of the center mass during relatively high rotational speeds. Since the tail journal bearing 472 preferably has a diameter which is essentially the same as the main section of the rotor or shaft 414, the rotor may be inserted into the center of an electrical motor's stator which may be a component of the center housing 428. In this case, the shaft section 414 may be the armature of a high speed motor. In this structure, such an armature may be assembled to the stator without disassembly of the rotating member. In the case of this structure, shifting of the center mass of the rotating member at relatively high speeds may be prevented since the rotor is essentially of one-piece construction, i.e., no assembly or disassembly is required after balancing of the rotating component.

The form of the present invention illustrated in FIG. 13 is a hydrostatic bearing using similarly dimensioned conical support bearings 500 and 502 and matching journals 503 and 504 on shaft 505. The same parts previously described will have the same reference numerals. The shaft 505 includes an integral thrust plate 510 located between the journals having radially extending faces 511 and 512, as illustrated, in which axial forces are generated for providing the required thrust bearing capacities. Pressurized fluid enters inlet 427 of the housing section 428, flows through passages 435 to passages 475 and exits through outlet 445.

A gas gap 513 is provided between journal 503 and associated support bearing 500, while a gas gap 514 is provided between journal 504 and associated support bearing 502. Support bearing 502 is resiliently supported by self-energizes spring assembly 515 and spring assembly 516; support bearing 500 being resiliently supported by seal assemblies 517 and 518, each of the same being as previously described. Also provided are axially mounted machined springs 520, 522, 523 and 524, located as indicated in the drawing. The self energized spring seals 515, 516, 517 and 518 are free to move axially and are retained by the associated axial springs. The axial springs in combination with the conical journals and support bearings provide for self-adjustment to maintain the clearances in the gaps 513 and 514, the required thrust forces being provided in the fluid bearing regions 511 and 512. The fluid bearing regions are provided by the rotating thrust plate 510 and the stationary thrust pad 530 and resiliently mounted thrust pad 532, the latter receiving flow of pressurized gas through orifices 535 from passageway 435. The support bearings are also provided with orifices for flow of gas into the gap.

In the form illustrated in FIG. 13, increased thrust capacity is achieved through the use of a thrust plate 510 in conjunction with stationary bearing surfaces 530 and 532, the latter being resiliently mounted by resilient supported face type self-energized spring seals 534 as already described in detail.

Figure 13A:
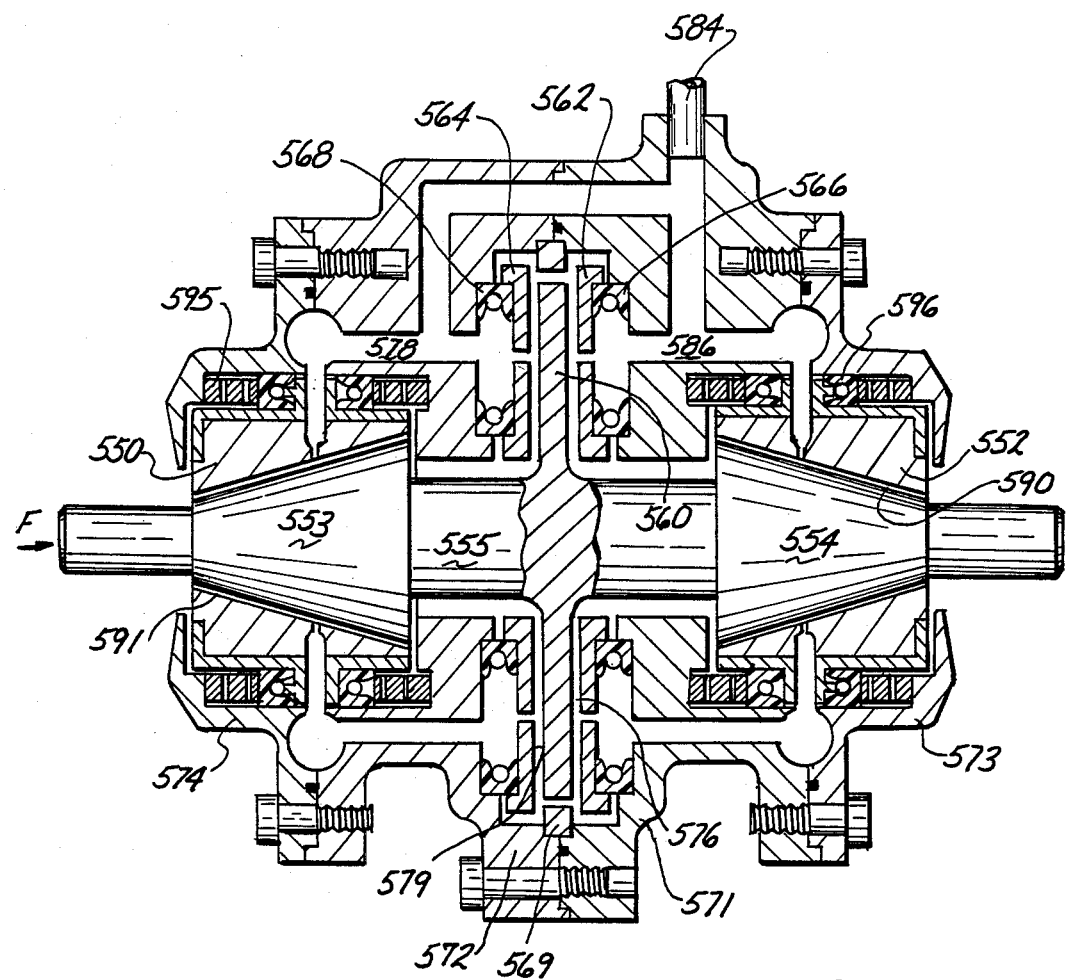
FIG. 13a is a view, partly in section and partly in elevation, of a bearing system in accordance with this invention using self-adjusting conical support bearings and a thrust plate.

The form of bearing assembly illustrated in FIG. 13a uses axially spaced conical support bearings 550 and 552 and associated axially spaced conical journals 553 and 554 on the shaft 555, the shaft having a thrust plate 560 affixed thereto and preferably evenly spaced between the journals. This form of the invention provides greater thrust capacity through the use of the disk-like thrust plate 560 which extends radially of the shaft. Associated with the thrust plate are mating thrust plate bearings, 562 and 564 located on each side of the thrust plate, as shown, and resiliently supported by internally self-energized spring face seals 566 and 568 which function as a resilient mounting and as a seal for the pressurized fluid which flows between the thrust plate and the thrust plate bearings. As an alternative, the spring face seals may be replaced by two annular spring face seals, one inwardly open and the other outwardly open.

An annular spacer 569 is positioned between housing sections 571 and 572 which are sealed together and sealingly assembled to outer sections 573 and 574, as shown. The spacer 569 operates to maintain the proper spacing in gaps 576 and 579. The resilient mounting of the thrust bearings 562 and 564 allows a greater alignment capability and an increased thrust capability.

The increased thrust capability may be explained as follows. If the shaft 555 is pushed to the right as seen in the drawing by a force F, the gap 576 closes and a greater pressure force is developed in that gap. Likewise, gap 579 increases and a lower pressure force will occur in the gap. The difference in the pressure forces and thus the generated thrust forces will resist the thrust force F. Since the stationary thrust bearings are resiliently mounted, they will also move in the same direction as the thrust force F. this movement will cause a relatively grater gap 579, since the resilient face seals 566 and 568 have a relatively low spring constant as compared to the gas film spring constant. This larger gap 579 as compared to a non-resiliently mounted thrust bearing will manifest a lower pressure in the gap therefore providing a greater thrust capacity as compared to a fixed, non-resilient mounting. The resiliently mounted thrust bearing system also provides for a more stable overall bearing assembly since its movement, in association with the dynamic damping, tends to prevent pneumatic hammer and the other self-generated oscillations.

Pressurized fluid enters through inlet 584 into ducts 586 and 587 for flow into and through the thrust bearings 562 and 564 and into the gaps 576 and 579. Fluid also flows into the gaps 590 and 591 between the support bearings and associated journals. The support bearings 550 and 552 are resiliently mounted by self-adjusting seal assemblies 595 and 596 and their associated machined springs, all of which has already been described.

Figure 14:
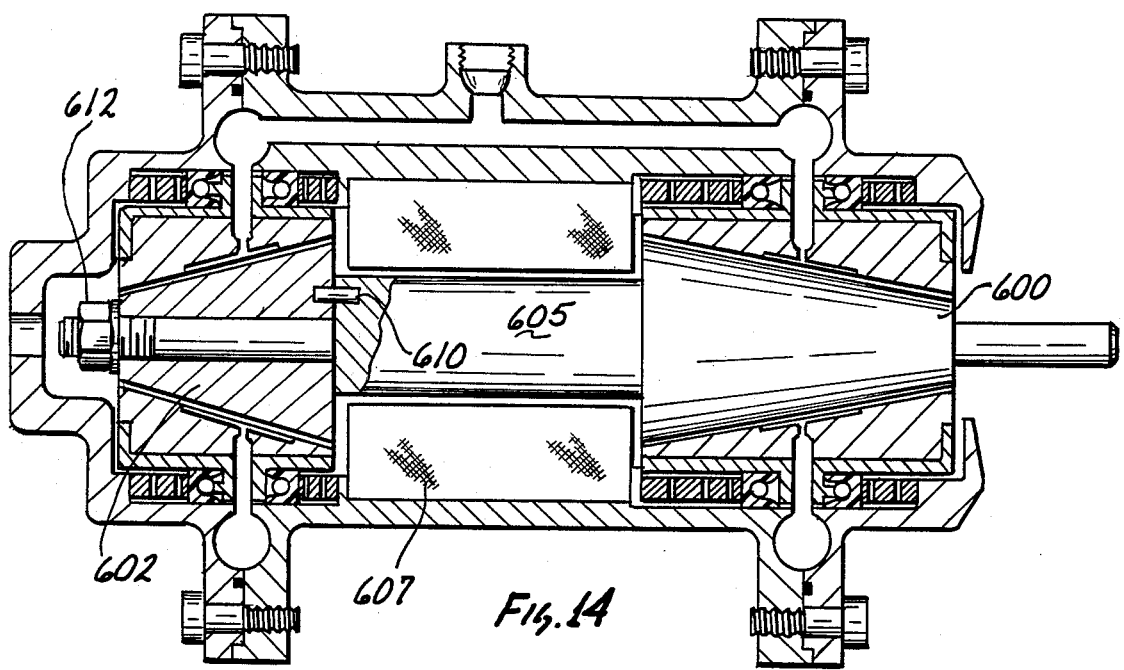
FIG. 14 is a view, partly in section and partly in elevation, of a bearing system in accordance with this invention in which the diameter of the journals are larger than the diameter of the shaft.
Figure 14A:
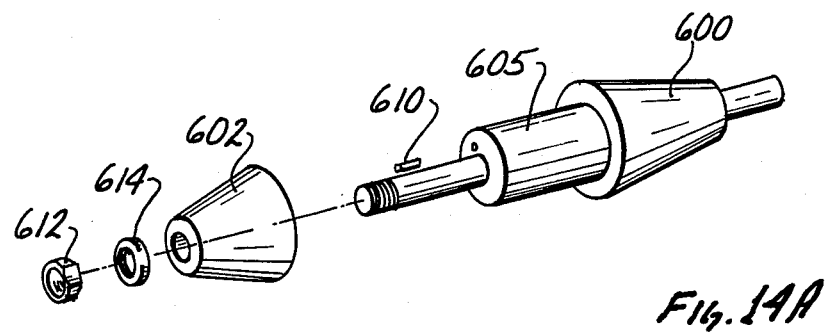
FIG. 14a is a developed view of a portion of the components illustrated in FIG. 14.

FIGS. 14 and 14a illustrate a self-adjusting conical bearing system in which the conical journal bearing surfaces 600 and 602 are larger in diameter than the main shaft 605 on which they are carried. This structure may be used where greater thrust and radial bearing support is needed than can be achieved by journals which can fit through the inner diameter of an associated component such as a motor stator 607. In this instance, one of the conical journals, e.g., 602 may be removed from the shaft 605 for assembly purposes. The correct orientation between the moveable journal bearing 602 and the shaft 605 is maintained by pin 610 which indexes the respective parts so as to prevent misalignment. In this way, out-of-balance conditions in disassembly and assembly are prevented. The conical journal 602 is secured to the shaft 605 by a nut 612 and a locking washer 614, as illustrated. The balance of the structure may be as previously described.

Figure 15:
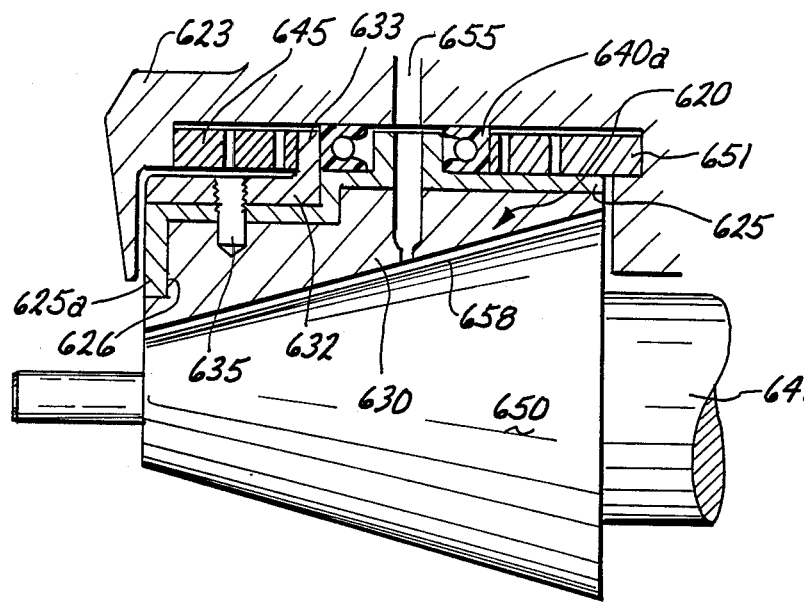
FIG. 15 is an enlarged fragmentary sectional view illustrating a conical bearing system in accordance with this invention in which an annular member for providing a thrust point for the machined spring is pinned to a non-rotating member.

FIG. 15 illustrates a form of the present invention for transmitting the thrust load generated by the conical support bearing 620 and the external forces on the bearing assembly through the support bearing to the housing 623. In this form, the conical support bearing includes an inner housing 625, a portion 625a of which extends radially over the end face 626 of bearing body 630 provided with an inner conical surface, as shown. Connected to the inner housing 625 and the bearing body 630 is an axially extending cylindrical contact member 632 having a radial shoulder 633. The cylindrical contact member move with the inner housing and bearing body since it is pinned thereto as indicated by pin 635, of which there may be several arranged around the periphery of the contact member.

The outboard self-energized spring seal 640 is contacted by and contained by the radial shoulder 633 of the contact member 632, as shown. Thus all of the thrust is directly transmitted to the self-adjusting thrust spring 645, in the form of an annular machined spring surrounding the shaft 647 and conical journal 650. One end of the machined spring bears against the radial shoulder and the other against the housing 623, as shown. Essentially all of the gas load on spring seal 640 is counteracted by contact element 632. Machined spring 651 transmits the axial thrust gas seal load from seal 640a to the housing 623. Thus essentially all of the thrust and seal gas load (all in the axial direction) is prevented from being transmitted from the support bearing through the seal 640 to the housing. This form of the invention eliminates the thrust loads from being transmitted from the bearing 630 directly through the self-energizing radial spring 653 which forms part of the seal assembly 640. As shown, pressurized fluid enters through inlet 655 into the gap 658 between the support bearing and the journal and exits as already described.

Figure 16:
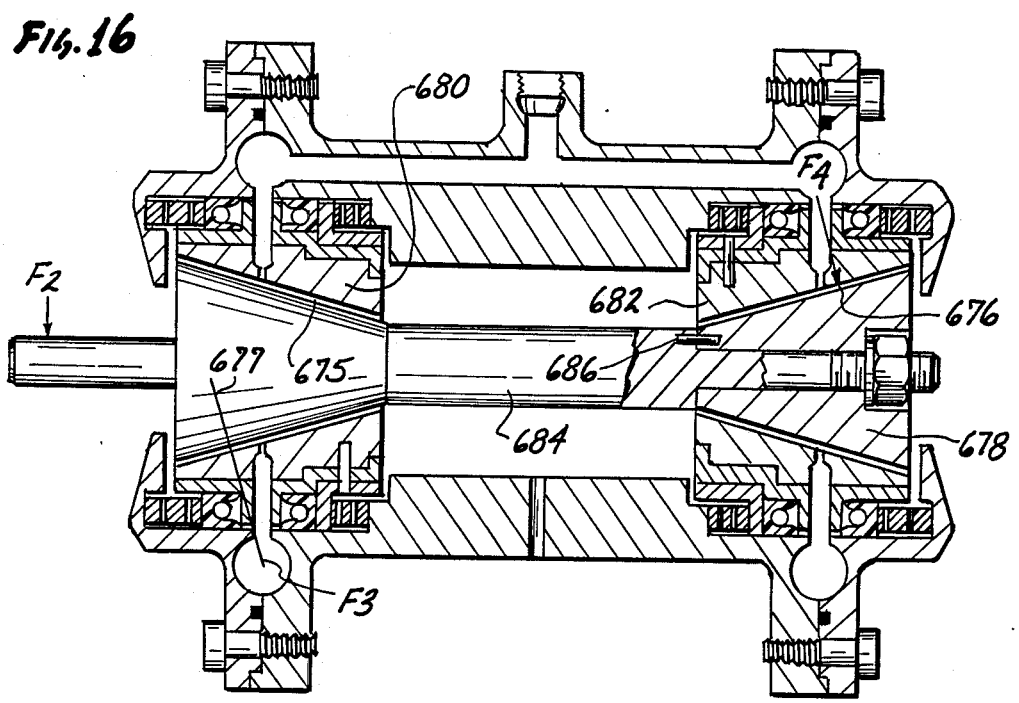
FIG. 16 is a view, partly in section and partly in elevation, of a bearing system in accordance with this invention in which the conical journals are mounted so that the larger ends are outward to provide more stability.

FIG. 16 shows a cross-sectional view of a conical bearing system in which the conical bearing surfaces 675 and 676, generated by conical journals 677 and 678, in conjunction with support bearings shells 680 and 682 respectively, are positioned with the large end of said conical surfaces outwardly facing from each other. This structure provides the most resistance to side forces such as F2 acting on shaft 684. F3 is the representative average bearing resistance force counteracting F2 generated by front bearing 677. A smaller reactionary force F4 is the representative average force acting on bearing 678. Because cone 677 is larger at the end closest to the imposed side force F2, the resulting generated counter torque is greater than in a system whose cones are facing with the large end towards the middle as previously described.

Figure 16A:
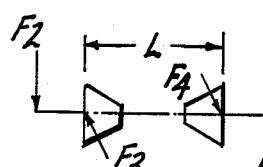
FIG. 16a is a diagrammatic view illustrating the resultant bearing forces of outwardly mounted journals.
Figure 16B:
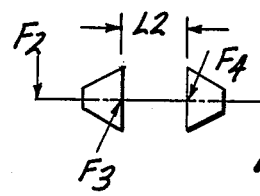
FIG. 16b is a view similar to FIG. 16a illustrating the resultant bearing forces for inwardly mounted journals.

This just mentioned effect can more easily be understood by comparing FIG. 16a with FIG. 16b, where it can be seen that the required bearing restoring forces F3 and F4 which are necessary to counteract side load F2 is much lower in the arrangement of FIG. 16a than that required in the arrangement of FIG. 16b. This is due to the direction in which these representative forces act and the resulting bearing spacing which occurs between the large diameter end of the two journal bearings in each of these two illustrated cases. FIG. 16a has a much greater distance L than corresponding bearing distance L2 of FIG. 16b, even though each bearing system has the same side load F2, and are of essentially the same bearing sizes. Thus the configuration shown in FIG. 16 is more stable and better suited to side loads.

In order to assemble this bearing system, one journal such as 676 is detachable from shaft 684. Pin 686 is used to keep journal 676 aligned with shaft 684 so as to prevent misalignment and out-of-balance forces upon assembly and reassembly. The support bearings 680 and 682 have the same construction as that shown and explained in greater detail in FIG. 15.

FIG. 17 is a cross section of a bearing system in which conical journal 700 has its large end 702 placed outward so as to have the best resistance to side loads as described in FIGS. 16, 16a, and 16b. In this embodiment the thrust due to the conical design of journal bearing 700 and support bearing 705, produced in bearing gap area 706 is counterbalanced by pressure from the bearing pressure fluid exhaust of region 706 at point 710 into gap region 712 between the end face 713 of the journal and the facing surface 714 of the housing 715. The pressure in end face gap region 712 counteracts the thrust produced by the conical bearing in the gap region 706 between the opposed conical surfaces. This design is self-balancing as a "stand-alone" one ended system.

This embodiment of the present invention illustrates a system which has considerably more thrust capacity against a thrust force F as shown in the given direction for the following reasons. First, as force F is applied to the journal bearing 700 and shaft assembly 720, a small movement occurs in the direction F. This movement allows an increase in the control exhaust area 722 thus allowing the pressurized gas in volume 712 to exhaust through passage 724. This lowers the gas pressure in volume 712, thus causing a greater thrust resisting force opposite to F. At the same time, the force F causes the gap or thickness of region 706 to decrease and thus causes less flow from exhaust 710 out of the gap 706 to flow into volume 712, thus further decreasing the pressure in volume 712, and thereby contributing to the generation of an ever greater thrust resisting force. The third effect of Force F is to increase the pressure in gap 706 by causing a decrease in the gap film thickness in this gap. Therefore, in summary, there are three effects which contribute to the exceedingly high thrust capabilities: (1) Increase of exhaust area 722. (2) Decrease of fluid flow into volume 712 by a decrease of area 710. (3) Increase of film pressure in region 706 from fluid entering said region through duct 730 via orifice 736.

Support bearings 705 are supported by self-energized spring seals 740 and 742. Thrust on support bearing 705 is counterbalanced by thrust spring 745 which may be a machined spring. A spacer or spring 746 maintains seal 740 in its desired position. Annular member 750 is pinned to the inner housing 752 of bearing member 705 by pin 754. Bearing material 756 is contained in the inner housing 752.

Figure 18:
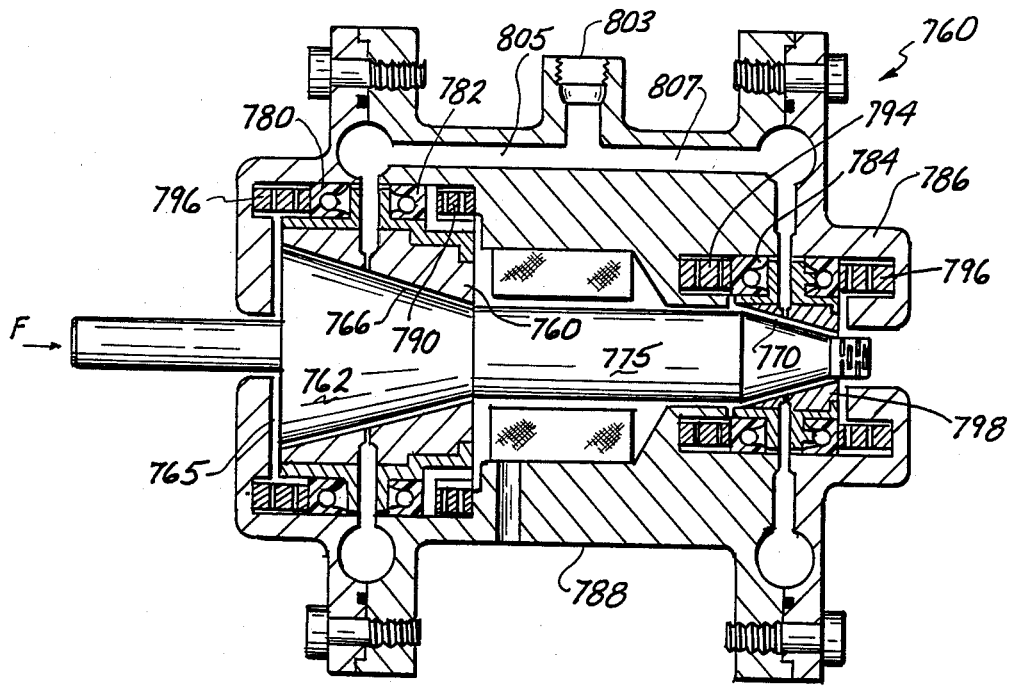
FIG. 18 is a view partly in section and partly in elevation, of a bearing system in accordance with this invention using a smaller stabilizing bearing at one end and larger bearing at the other end.
Figure 18A:
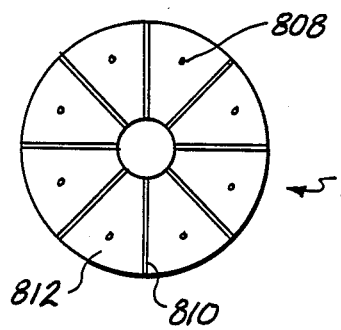
FIG. 18a is a sectional view taken along the line 18a–18a of FIG. 18.

The form of the present invention illustrated in FIGS. 18 and 18a employs the structure as described in FIG. 17 at the larger conical bearing 760 and journal 762. The self-balancing thrust under no external thrust load conditions is produced by pressurized gasses in region 765 exhausting from the gap 766 at point 769. Thrust reaction forces opposing external force F occur in gaps 766 and 770. The conical journal 772 is a radially stabilizing journal bearing and is of such a size as to allow assembly of the rotating unit without disassembly of its parts. That is, the major diameter of the rear bearing journal is of the same size as the motor armature 775, so as to allow for reassembly without disassembling the rotor unit. The resisting thrust against force F is produced in conical gap regions 766 and 770. The counter-resisting thrust for keeping the unit in equilibrium occurs in region 765. The conical bearings are both self-adjusting for maintaining the optimum bearing gap thicknesses. Bearings 760 and 778 are radially supported by self-energizing spring seals 780, 782, 784, and 786. All thrust loads are transmitted to housing 788 through springs 790 and 796. Members 794 and 798 can be either a spacer or spring to keep sealing springs 780 and 784 in their respective required axial positions. Bearing gas or fluid enters through port 803 and is ducted to bearing gap regions 766 and 770 via ducts 805 and 807 respectively. The bearings spend gasses exhaust around front shaft, out of rear, and also through housing at point B.

FIG. 18A is one type of bearing section as seen looking into bearing member 760 showing bearing inlet orifices 808 and exhausting grooves 810 which create separate bearing pads 812. In many cases, just plain conical surfaces with inlet orifices 808 may be used. Various pocket geometry may be used on bearing member 760, and in conjunction with herringbone geometry on the rotating member in order to optimize and enhance the stability of these systems. It is obvious that if this was a pure hydrodynamic bearing, it would generate its own gas film pressures and operate in the manner as previously described, except no external pressurized gasses would be required. However, the pressurized systems (hydrostatic) operate at all speeds and in general have greater load carrying capacity.

Figure 19:
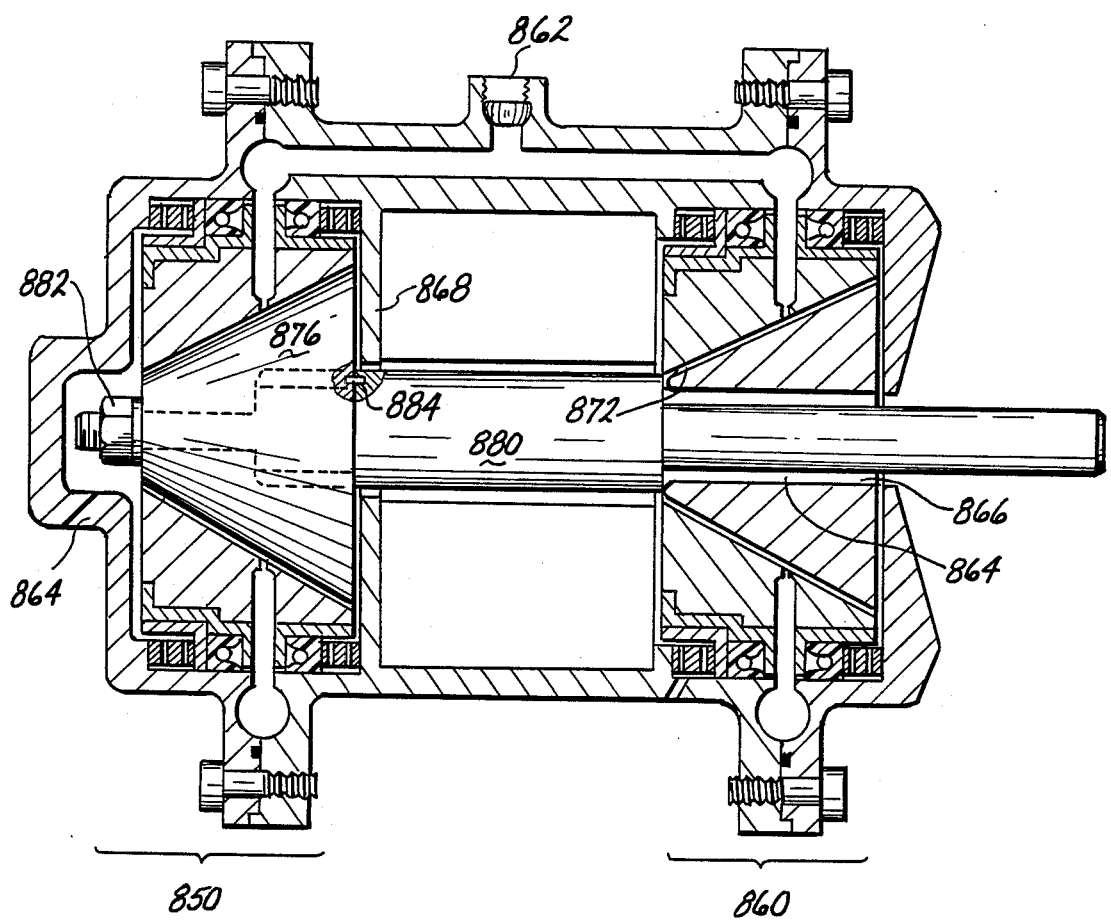
FIG. 19 is a view similar to FIG. 18 showing the use of two relatively large bearings to produce increased thrust restoring forces in accordance with this invention.

FIG. 19 shows the utilization of two bearing systems as described in FIG. 17, and represented by rear bearing system 850, and front bearing system 860. Bearing air enters at 862, and exhausts from ports 864 and 866. The exhaust from rear thrust plate 868 and exhaust to the small end of front bearing at point 872, exhaust through ports 864 located in front bearing 867. This bearing configuration resists the thrust load force F to a greater extent (by approximately a factor of two) over the system described in FIG. 18, since it has approximately twice the projected area for counteracting thrust forces. The embodiment shown in FIG. 19 is best suited in applications where greater thrust loads are required such as for drilling machine spindles. The rear bearing cone 876 is secured to shaft 880 by nut 882, and said cone is kept registered by pin 884.

The resiliently mounted bearing assembly of this invention may be used in a gas lubricated spindle assembly, as already mentioned. Referring to FIG. 20 which is essentially a one-to-one scale drawing, a hydrostatic gas bearing spindle assembly 1000 is illustrated incorporating the various features of the present invention as well as several other desirable features, for the purpose of illustrating the advantages of this invention. The spindle illustrated is capable of rotational speeds as high as 120,000 RPM or greater, as mentioned, and may be operated a speeds as low as 15,000 RPM with a thrust load capability of as high as 55 to 60 pounds and can withstand side loads of 15 pounds. As illustrated the unit weighs less than 5 pounds, a factor which is significant in terms of use as a spindle for circuit board drilling machines and other precision drilling operations. In general, this structure may drive a drill as small as 4 mils in diameter or as large as ¼ of an inch. The rotor is driven by an electrical motor, cooled by water and uses air, filtered through normal shop filters such as 0.05 micron filter and which need not be dehumidified. The water need not be refrigerated. Air at 80 psig and at a rate of 2.0 scf/minute is more than adequate for the spindle and bearing described.

The gas bearing spindle includes a main housing 1002 which is generally cylindrical in shape and to which is affixed an end plug 1003 screwed into the end of the main housing. The end plug includes a central aperture 1004 through which a rotatable shaft 1005 extends. Mounted on the other end is an upper housing assembly 1007 to which is affixed a cover assembly 1009, as indicated. The upper housing contains a tool release actuating mechanism generally designated 1010, the latter being conventional and not forming part of this invention. The upper housing also includes a side extension 1011 to which is gas sealed an electrical connection terminal 1013 for the wires for the electrical motor.

The electrical wires pass from the side extension into a axial passageway 1015 in the main housing and are connected to a stator 1017 which is supported, such as by a suitable adhesive, in the main housing and bearing against a shoulder 1018, as shown. Mounted on the shaft 1005 which extends axially of the main housing is a rotor 1020, the latter operating to rotate the shaft, there being a small clearance between the rotor and the stator. It is apparent that due to the high rotational speeds, the rotor should be structured to withstand the same and the structure to achieve this is well known in the art. The shaft also carries two conical journals 1025 and 1030 arranged such that the small end of the cones are facing in opposite directions and disposed such that one journal is on each side of the rotor, the journals rotating with the shaft. Journal 1025 is pinned to the shaft and is removable therefrom for ease of assembly as already described. Journal 1030 may be affixed to the shaft by an adhesive or other suitable means. In a preferred form, the journals may be fabricated or hold anodized aluminum and may include a plurality of blind holes 1025a and 1030a on the large diameter ends of the cone to reduce weight. The Journals may also be fabricated of ceramic materials such as aluminum oxide.

Cooperating with the journals are spaced conical support bearing assemblies 1050 and 1055 which are resiliently mounted in the housing for the reasons already described. Each of the support bearing assemblies includes a bearing housing 1050a and 1055a which supports an associated bearing member 1050b and 1055b, the latter having conical inner surfaces which mate with the contour of the associated journals such that in normal operation there is a small gas gap 1050c and 1055c between the support bearings and the associated journal. In a preferred form, the bearing material may non-porous graphite and forms with the journals a non-galling pair of facing surfaces. The outer peripheral surface of the bearing assemblies each include a radially extending shoulder 1050d and 1055d, as already described, the latter being received in recesses in the housing as also described. Received within the recesses and located on each side of each of the shoulders is a resilient seal assembly 1060, 1062, 1064 and 1066 which may be of any of the types already described and which function as already described.

The shoulder of each of the support bearings is provided along its outer surface with a circumferential groove 1070 and 1072, respectively, which effectively forms a manifold for flow of air into the gas gap of each bearing-journal pair. Each support bearing assembly includes a plurality of apertures 1050e and 1055e which communicate with the groove for flow of air into the gap, and in a preferred form there are four apertures, located at 90 degrees, the diameter of the apertures being about 11.5 mils for the reasons already noted.

Referring to FIG. 21, the location of the apertures, for example 1055e is illustrated. Associated with each of the apertures of each of the support bearings is a pressure relief groove 1076–1079 provided in the inner face of the bearing material, i.e., the surface facing the journal. Assuming the rotation of the shaft is as indicated by the arrow, each groove is also off-set radially such that it is closer to the aperture located in the clockwise location than that in the counterclockwise location. As shown, the grooves extend from the smaller diameter end of the cone and terminate short of the larger diameter end, i.e., they do not extend the full axial distance of the support bearing face. The preferred orientation is that the groove and its associated aperture form an angle of 30 degrees as measured from the center, as illustrated.

These grooves and their location with respect to the apertures and in relation to the direction of shaft rotation perform two functions which tend to reduce axial and radial vibrations of the bearing during operation. For example, if a portion or all of the gap increases in dimension, then the gas pressure drops and the result is that the parts tend to move closer together in the region of the pressure drop. As the parts move closer together, the pressure increases as the gap or a portion of the gap becomes smaller. The result is a cycling due to changes in pressure in the gap which is believed to cause vibrations believed to be due, at least in part, to the time delay required to reach an equilibrium condition. The grooves, it is believed, tend to reduce the time delay, and equilibrium is reached in a much shorter period of time thus reducing undesirable vibrations by allowing increasing gas pressure to bleed off faster.

The second function of the grooves is related to the complex whirl phenomena which tends to cause an epicyclic rotation of the shaft. It is believed that this is due to the fact that the gas pressure distribution may not be uniform in the gap. For example, if the grooves are located symmetrically and evenly between adjacent apertures, the pressure between the groove and the associated aperture is higher than that between the aperture and the next adjacent groove. The relatively large regions of adjacent high and low pressure tends to cause the movement described. By arranging the grooves closer to the associated aperture, the region of comparatively high pressure is reduced and objectionable epicyclic motions are reduced. It has been found that the 30 degree orientation described operates quite satisfactorily for the structure described. It is apparent that the grooves may be used in any of the structures already described.

Cooperating with the support bearing assembly 1055 is a machined tilter spring 1080 having a comparatively high resistance to axial compression, as compared to the machined springs already described, and in the form of an annular machined spring illustrated in more detail in FIG. 22. A machined spring in the form already described may be used although the machined tilter spring 1080 is quite rigid in an axial direction. It can, however, tilt with respect to the axis of the shaft as will be apparent from the structure thereof.

Referring to FIG. 22, the machined tilter spring 1080 is composed of two spaced narrow continuous beams 1080a and 1080b with an intermediate continuous beam 1080c which is substantially longer in axial dimensions than beams 1080a and 1080b. Between the beams 1080a and 1080c are two circumferential slots 1082 and 1083 with a solid section 1084 interconnecting beams 1080a and 1080c. There are two solid sections, arranged 180 degrees apart. The lower beam 1080b is separated from beam 1080c by circumferential slots 1085, there being two. The latter slots 1085 are oriented 180 degrees out of phase with slots 1082 and 1083 and are also separated by two solid sections which are offset 90 degrees with respect to the solid sections 1084. In effect, the end beams form resiliently bendable beam sections arranged in 90 degree increments, two of which are located at a 180 degree orientation on each end but offset by 90 degrees. The result is that the machined tilter spring 1080 is rigid axially but tiltable. The machined tilter spring thus compensates for angular movement of the support bearing assembly 1055 with respect to the housing.

Referring again to FIG. 20, one end 1086 of the machined tilter spring 1080 bears against the plug 1003 and the other end 1087 bears against the bearing housing 1055a. Should the bearing assembly 1055 attempt to tilt, the machined tilter spring allows for such movement. Positioned radially outwardly of the machined tilter spring 1080 is a solid sleeve 1090 one end of which bears against the spring assembly 1066 and the other end of which bears against the plug 1003, as shown, to maintains this seal assembly in position. This sleeve also prevents the bearing assembly 1055 from bottoming out on the plug 1003. Also associated with the companion seal assembly 1064 is a second solid sleeve 1092, one end of which bears against the seal assembly 1064 and the other end of which is received in a shoulder 1094 provided on the inner wall of the housing, as shown.

Cooperating with spring seal assembly 1060 is a machined spring 1096 similar to those already described, one end of which bears against the seal assembly 1060 and the other end of which bears against a radially inwardly extending section 1097 which forms part of the upper housing assembly. The radial section 1097 includes a plurality of apertures 1097a whose function is to permit flow of air, as will be described. Positioned radially inwardly of the spring 1096 is another machined spring 1099 having a structure as already described, one end of which bears against the support bearing assembly 1050 and the other end of which bears against the radial section 1097. The machined spring 1099 operates as the main axial thrust spring for the bearing assembly while the machined spring 1096 cooperates with the associated spring seal assembly to mount the same resiliently for axial movement. Located between support bearing assembly 1050 and the stator 1017 and bearing against an inwardly extending shoulder 1102 on the inner surface of the housing is a pressure plate 1105 having a radially inwardly extending lip 1105a and an axially extending lip 1105b, the latter bearing against the spring seal assembly 1062. The pressure plate operates to assist in disassembly of the structure by holding the journal 1025 as the shaft and other journal are pushed out of the housing after the end plug 1003 is removed.

As illustrated, the shaft 1005 is hollow along its length to receive a drawbar 1110, one end of which is threaded as at 1112 to receive a split collet 1114 having an outside tapered surface for holding a tool. The details of the drawbar and collet are as described in my prior patent U.S. Pat. No. 4,640,653 and previously described application. A driving rotary connection between the drawbar 1110 and the shaft is made by a splined connection 1116 or other suitable means which allows limited relative axial movement between the drawbar and the shaft. Threaded on one end of the shaft 1005 is a spring nut 1120 in which the spring is a machined spring having the structure and function of my prior U.S. Pat. No. 4,640,653 and previously identified application whose disclosures are incorporated herein by reference. The end of the drawbar includes a head 1123 having an external shoulder 1123a which bears against the end of the spring nut. The end of the spring nut facing the collet is formed with an internal concave spherical face 1123b which mates with an internally threaded nut 1125 having one flat face 1125a and one convex spherical face 1125b whose contour matches the concave face 1123b of the spring nut 1123. The flat and planar face 1125 of the nut bears against the end face of journal 1025 to hold the latter on the shaft, the latter being pinned, as indicated at 1126 to the rotor which is joined to the shaft by adhesives or other suitable means.

The use of mating spherical surfaces between the spring nut and the mating nut 1125 offers unique advantages. For example, if care is not taken in forming the threads on which nut 1125 is mounted, or if the end face of the journal is not formed planar and true with respect to the shaft axis, then as the nut is tightened on the shaft to hold the journal, a very slight bend may be placed on the shaft which increases as the temperature increases due to the tendency of the shaft to elongate. If the threads and end face of the journal are formed with extreme care or by accurate machining equipment, conventional nuts may be used. If there is a small bend in the shaft as a result of threading problems, the result tends to be epicyclic motion of the shaft. The use of a nut and spring nut with the mating spherical surfaces eliminates any such problems by forming essentially a partial ball joint which prevents shaft bending during assembly or during operation.

As shown, the spring nut 1120 tends to urge the drawbar to the right as seen in the drawing with the result that the collet is in a locking position and tightly grips a tool. To release the collet and the tool, rotation of the spindle is stopped and the drawbar is moved to the left as seen in the drawings. One mechanism by which tool release may be achieved is by a air operated tool release mechanism 1010, the latter being conventional in design and not forming part of this invention. Any of the tool release mechanisms known in the art may be used.

Mechanism 1010 includes a cylinder 1150 received within the end housing 1007, the cylinder including an inner radially inwardly shoulder 1152 which forms a stop for the axial movement of the spring nut and the drawbar 1110. The cylinder is sealed to a guide 1154 which receives an O-ring 1154a. Associated with the cylinder 1154 is a head member 1156, moveable axially and sealed to the inner surface of the cylinder by an O-ring, as shown. The cover assembly 1009 includes an air fitting 1157 which is O-ring sealed to the head 1156, the latter being secured against excessive axial movement by a lock ring 1159 received within the cylinder.

Received within the cylinder is an axially moveable piston 1165, sealed to the cylinder by an O-ring, as shown. The piston includes a centrally located shaft 1166 which travels axially in a seat 1170, the latter having an inner axial shoulder 1170a and an outer periphery seated on a shoulder 1172 provided on the inner surface of the cylinder. The end 1175 of the shaft is in axial alignment with the end of the end of the drawbar. Located between the seat and the back face of the piston and surrounding the shaft is a helical spring 1180 which urges the piston and the shaft away from the end of the drawbar.

When a tool change is desired, rotation is stopped, air is introduced into the space 1185 between the head and the piston tending to force these two elements apart. The piston moves against the spring and the end 1175 of the shaft bears against the end of the drawbar and against the spring nut to move the drawbar to the left as seen in the drawing to release the collet and the tool. After a new tool has been placed in the collet, the air in chamber 1185 is released and the spring urges the piston away from the end of the drawbar and the spring nut urges the drawbar to the right as seen in the drawings to close the collet in the shaft. During rotation, the drawbar rotates with the shaft through the spline connection.

One of the advantages of the present design is that the self balancing nature of the spindle and bearing assembly assures that the tool point runs on a true axis of rotation. For example, if the collet is not concentric, the point of the drill travels eccentrically. For larger diameter drills, e.g., ¼ of an inch, a small eccentric motion may be tolerable, but for small diameter drills, e.g., 4 mils, even small amounts of eccentric motion may not be tolerable. By the present invention, due to the self-balancing nature of the bearing, the system compensates for non-concentric collets and tends to keep the point of the drill rotating on the true mass center of the drill bit.

To cool the spindle during operation against heat build up due to the heat generated by the electrical motor, the outer surface of the housing is preferable provided with a plurality of passageways 1187 which are interconnected and extend around the outer surface of the housing. A reverse flow pattern is desired and thus cooling fluid such as water is flowed into the passageways from an inlet, not shown, to a reverse flow passage 1188 at the front end of the spindle, through the passageways 1187 and to an outlet, not shown. The cooling passages are formed by an outer cover 1190 which is affixed to the housing by an adhesive although other attachment and fluid tight sealing structures may be used. If an adhesive is used, it is preferred to form the cover with a series of shoulders such that the diameter to the front of shoulder 1190a is greater than that of the section to the front of shoulder 1190b. The outer surface of the housing is corresponding dimensioned. The use of shoulders prevents the adhesive from being skived off as the cover is assembled over the housing.

One of the singular advantages of this invention is that all of the gas, e.g., air used to lubricate the bearing, may be caused to exit from the front of the bearing. This is of practical importance in circuit board drilling due to the nature of the cuttings, especially with small diameter drills. Air exiting from the front also tends to keep the collet clear of debris and tends to prevent the tool from being held off center due to debris in the collet.

Thus, gas and preferably air under pressure is introduced into the bearing through an inlet 1195 in the housing and flows to a passageway 1198 which communicates with grooves 1070 and 1072 which are in communication with the apertures in the support bearings. Positioned between the plug 1003 and the support bearing 1055 and held in place thereby and located in aperture 1004 is a shield 1200 which surrounds but does not contact the shaft. All of the air which enters the bearing system exits between the inside of the shield and the outer surface of the shaft.

For example, a portion of the air from the gap between journal 1030 and support bearing 1055 exits directly into the space between the shaft and the shield. Air exiting the other end of the same gap flows into a chamber 1202 between the stator and journal 1030 and exits through apertures 1204 into the exit at the front end. A portion of the air from the gap between journal 1025 and support bearing 1050 exits into an annular chamber 1207 and flows between the rotor and stator, partially cooling the same and then into chamber 1202 and out the passages 1204 to the exit.

The remaining air from the same gap exits into the annulus radially inwardly of spring 1099 and in the region of the spring nut. A portion of that air flows between the drawbar and the shaft and out the exit while the remainder flows through apertures 1097a into the region of the side extension 1011, through the aperture 1015 for the wiring and the either around the outside of the stator or between the rotor and the stator to the exit as already described. The reverse flow of the liquid coolant tends to coole the air as it leaves the exit. It is thus clear that all of the incoming air exits out the front of the unit, with the advantages as noted.

It is to be understood the features described in connection with the structure of FIG. 20 may be incorporated in the remaining structures described.

From the above detailed description of the present invention, it will become apparent to those skilled in the art that there are several significant advantages of the present invention. For example there are singular cost advantages since the construction uses readily available materials in a design which is relatively simple to manufacture because of the relatively non-critical tolerances and the self-adjusting feature as described. The present structure also avoids the need for sophisticated air purifying and dehumidifying equipment or liquid refrigeration systems for coolant. It is comparatively light in weight and easy to repair. The amount of air usage is relatively low compared to currently commercially available unit, already identified.

From the technical performance standpoint, apart from the economies of manufacture, use and repair, there are a minimum of air supply holes which are relatively large in diameter. The bearing of this invention is not sensitive to dirt contamination as is the case with currently available products. The facing surfaces of the bearing and journal are self-polishing rather than self-destructive. In the event of accidental surface-to-surface contact, for whatever reason, the opposing surfaces tend to lap rather than gall. The bearing system is self-adjusting and automatically maintains the minimum optimal clearance between the opposed surfaces for proper operation.

The use of conical journals and associated support bearings which are resiliently mounted affords greater thrust and inherent stability. The gas exhausts from the front end of the assembly to keep debris from entering the bearing or any tool holder or changer mounted thereto and aids in clearing the workpiece of debris. There is a significant improvement in the ability of the system to accommodate thrust loads; the use of pockets provides for even greater thrust loads. Temperature fluctuations seem to have no appreciable affect due to the self-adjusting character of the bearing system. Actual operation of an experimental unit in accordance with this invention for over 8,000 hours has demonstrated the reliability and performance of air bearing spindle assemblies in accordance with this invention.

From the above description, a number of various structures has been described and it will become apparent to those skilled in the art that various modifications and alterations may be made by those skilled in the art in accordance with this disclosure without departing from the spirit and scope of the present invention, as set forth in the appended claims.

What is claimed is:

1. A resiliently mounted fluid bearing system for use at relatively high rotational speeds comprising:
   support means,
   shaft means having an axis of rotation and including spaced portions forming spaced journals having outer surface portions and arranged along the axis thereof,
   at least two axially spaced bearing means mounted in spaced relation in said support means and surrounding said shaft means at spaced positions along the axis thereof,
   each said bearing means including an inner surface portion which is in spaced relation to the outer surface portion of said spaced journals to form a fluid gap therebetween such that the fluid in said gap supports said shaft for rotation with respect to said spaced bearing means,
   each said bearing means included an outer bearing surface portion in opposed spaced relation to said support means,
   each said bearing means including resilient means cooperating with said support means and surrounding the outer bearing surface of each said bearing means for mounting each said bearing means resiliently with respect to said support means,
   each said resilient means including resiliently biased relatively low friction inner and outer surface support portions,
   the inner surface support portion of said resilient means continuously surrounding and contacting said outer cylindrical surface portion of said bearing means,
   the outer surface support portion of said resilient means continuously contacting said support means, and
   said resilient means cooperating with each said associated bearing means to permit relative axial movement between said bearing means and said support means and to permit angular and radial movement of each said bearing means relative to said support means such that the fluid gap between each said bearing means and the outer surface of said journals is maintained during rotation of said shaft and during relative radial, angular and axial movement of said shaft with respect to said support means.

2. A resiliently mounted fluid bearing system as set forth in claim 1 wherein at least one of said resilient means cooperating with said support means includes at least one resilient spring seal assembly;
   said at least one resilient spring assembly including at least one spring member encircling the outer surface of said bearing means and said spring means including said associated low friction seal member having inner and outer surface support surface portions; and
   said spring assembly urging said inner and outer surface support portions in opposite radial directions to support resiliently said bearing means.

3. A resiliently mounted fluid bearing system as set forth in claim 2 wherein at least one machined spring is associated with said spring seal assembly and is positioned between said support means and the associated said bearing means.

4. A resiliently mounted fluid bearing system as set forth in claim 1 further including at least one machined spring associated with said resilient means and positioned between said support means and the bearing means associated with said resilient means.

5. A resiliently mounted fluid bearing system as set forth in claim 1 wherein said shaft includes means forming a thrust plate.

6. A resiliently mounted fluid bearing system as set forth in claim 5 wherein said thrust plate is located between the spaced support bearings.

7. A resiliently mounted fluid bearing system as set forth in claim 5 wherein said thrust plate is located on one side of said spaced support bearings.

8. A resiliently mounted fluid bearing system as set forth in claim 1 wherein said spaced journals are conical journals and said support bearings are conical in shape to receive said spaced journals.

9. A resiliently mounted fluid bearing system as set forth in claim 8 wherein the cone angle of said conical journals is the same.

10. A resiliently mounted fluid bearing system as set forth in claim 8 wherein the cone angle of said conical journals is different.

11. A resiliently mounted fluid bearing system as set forth in claim 8 wherein said conical journals are arranged such that the smaller end of the cones are in facing relation.

12. A resiliently mounted fluid bearing system as set forth in claim 8 wherein said conical journals are arranged such that the smaller end of the cones face in the same direction.

13. A resiliently mounted fluid bearing system as set forth in claim 8 wherein the conical journals are arranged such that the smaller end of the cones face in opposite directions.

14. A resiliently mounted fluid bearing system as set forth in claim 8 wherein the large diameter end of one of the conical journals is larger than the large diameter end of the other conical journal.

15. A resiliently mounted fluid bearing system for use at relatively high rotational speeds comprising:
 housing means,
 shaft means having an axis of rotation and including spaced portions forming spaced journals having outer surface portions and arranged along the axis thereof,
 at least two axially spaced bearing means mounted in spaced relation in said housing means and surrounding said shaft means at spaced positions along the axis thereof,
 each said bearing means including an inner surface portion which is in spaced relation to the outer surface portion of said spaced journals to form a fluid gap therebetween such that the fluid in said gap supports said shaft for rotation with respect to said spaced bearing means,
 each said bearing means including an outer bearing surface portion in opposed spaced relation to said housing means,
 the outer bearing surface of each said bearing means including a radially outwardly extending shoulder,
 said housing including spaced annular recess for receiving said shoulder of said bearing means,
 each said bearing means including resilient means cooperating with said housing means and surrounding the outer bearing surface of each said bearing means and positioned between said shoulder and the associated recess for mounting each said bearing means resiliently with respect to said housing means,
 each said resilient means including resiliently biased relatively low friction shell member having inner and outer surface support portions,
 the inner surface support portion of said resilient means continuously surrounding and contacting said outer cylindrical surface portion of said bearing means,
 the outer surface support portion of said resilient means continuously contacting said housing means,
 said shell member being disposed between said shoulder and said associated recess such that inner and outer surface support portions face said shoulder, and
 said resilient means cooperating with each said associated bearing means to permit relative axial movement between said bearing means and said housing means and to permit angular and radial movement of each said bearing means relative to said housing means such that the fluid gap between each said bearing means and the outer surface of said journals is maintained during rotation of said shaft and during relative radial, angular and axial movement of said shaft with respect to said housing means.

16. A resiliently mounted fluid bearing system as set forth in claim 15 wherein said resilient means includes a pair of spaced resiliently biased low friction shell members, and
 said shell members being disposed in said recess and arranged such that the inner and outer surface support portions thereof are in facing relation with respect to said shoulder.

17. A resiliently mounted fluid bearing system as set forth in claim 16 wherein said resilient means includes a spring element received in said shell and urging said inner and outer surface support portions in opposite radial directions.

18. A resiliently mounted fluid bearing system as set forth in claim 17 wherein said spring element is a helical spring.

19. A resiliently mounted fluid bearing system as set forth in claim 18 wherein said helical spring is a flat wound spring.

20. A resiliently mounted fluid bearing system as set forth in claim 17 wherein said spring element is a generally U-shaped spring.

21. a resiliently mounted fluid bearing system as set forth in claim 17 wherein said shoulder of said support bearings includes an axially extending projection, and
 said projection contacting the spring element which is received in said shell element.

22. A resiliently mounted fluid bearing system as set forth in claim 15 wherein said spaced journals are conical in shape and wherein said support bearings are conical in shape, and
 said journals and said support bearings being composed of non-galling material.

23. A resiliently mounted fluid bearing system as set forth in claim 15 wherein said bearing system is a hydrostatic bearing system,
 said housing means including passage means for introduction and flow of fluid under pressure into said system and for discharge of said fluid, and
 said bearing means including at least one aperture therein for flow of pressurized fluid into the gap between the bearing means and the journals.

24. A resiliently mounted fluid bearing system as set forth in claim 21 where said apertures are greater than 4 mils in diameter.

25. A resiliently mounted fluid bearing system as set forth in claim 23 wherein the surface of said support bearing facing said journal includes a pocket associated with said aperture.

26. A resiliently mounted fluid bearing system as set forth in claim 23 wherein said fluid under pressure operates to force said inner and outer surface support portions in opposite radial directions to form a fluid tight seal between said housing means and said support bearings.

27. A resiliently mounted fluid bearing system as set forth in claim 15 wherein at least one machined spring is associated with each resilient means to urge the latter axially.

28. A resiliently mounted fluid bearing system as set forth in claim 27 wherein each resilient means includes a machined spring on each side thereof to urge the resilient means axially.

29. A resiliently mounted fluid bearing system as set forth in claim 15 wherein said resilient means includes a double ended low friction shell member having spaced pairs of inner and outer surface portions, and
 spring means associated with each pair of said inner and outer surface portions to effect biasing of the same in opposite radial directions.

30. A resiliently mounted hydrostatic fluid bearing system for use at relatively high rotational speeds comprising:
 housing means, shaft means having an axis of rotation and including spaced journals having outer surface portions and arranged along the axis of said shaft, at least two axially spaced support bearings mounted in spaced relation in said housing means and surrounding said shaft means at spaced positions along the axis thereof, each said support bearing including an inner surface portion which is in spaced relation to the outer surface portion of said spaced journals to form a fluid gap therebetween such that the fluid in said gap supports said shaft for rotation with respect to said spaced support bearing, said housing means including an inlet for entry of fluid under pressure and an outlet for discharge of said fluid, passageway means in said housing means for flow of fluid from said inlet and into said gap and to said outlet, each said support bearing including at least one aperture therein of a diameter greater than about 4 mils for flow of fluid into said gap, said support bearings and said journals being composed of non-galling material, each said support earing including an outer bearing surface portion in opposed spaced relation to said housing means, the outer bearing surface of each said support bearing including a radially outwardly extending shoulder, said housing including spaced annular recess for receiving said shoulder of said support bearing, each said support bearing including resilient means cooperating with said housing means and surrounding the outer bearing surface of each said support bearing and positioned between said shoulder and the associated recess for mounting each said support bearing resiliently with respect to said housing means, each said resilient means including resiliently biased relatively low friction shell member having inner and outer surface support portions and spring means to urge said surface support portions in opposite radial directions, the inner surface support portion of said resilient means continuously surrounding and contacting said outer cylindrical surface portion of said support bearing, the outer surface support portion of said resilient means continuously contacting said housing means, said shell member being disposed between said shoulder and said associated recess such that inner and outer surface support portions face said shoulder, and said resilient means cooperating with each said associated support bearing to permit relative axial movement between said support bearing and said housing means and to permit angular and radial movement of each said support bearing relative to said housing means such that the fluid gap between each said support bearing and the outer surface of said journals is maintained during rotation of said shaft and during relative radial, angular and axial movement of said shaft with respect to said housing means.

31. A resiliently mounted fluid bearing system as set forth in claim 30 wherein said support bearings include pockets communicating with said apertures.

32. A resiliently mounted fluid bearing system as set forth in claim 31 wherein each said support bearing includes a support bearing housing having said shoulder provided thereon and a bearing mounted in said support bearing housing.

33. A resiliently mounted fluid bearing system as set forth in claim 32 further including an inner bearing housing associated with each bearing housing, said inner bearing housing including a tubular member communicating with said passageway means for flow of fluid into said gap, and means mounting said bearing housing and said inner bearing housing for axial movement together.

34. A resiliently mounted fluid bearing system as set forth in claim 30 wherein said support bearings and journals are conical in shape.

35. A resiliently mounted fluid bearing system as set forth in claim 34 wherein said resilient means is located at least on the outboard side of said shoulder, and at least on machined spring located in said recess and position outboard of said resilient means.

36. A resiliently mounted fluid bearing system as set forth in claim 38 wherein said support bearing and said journals are arranged such that the smaller end of the cones are facing in opposite directions.

37. A resiliently mounted fluid bearing system as set forth in claim 35 wherein said support bearing and said journals are arranged such that the smaller end of the cones are facing in the same direction.

38. A resiliently mounted fluid bearing system as set forth in claim 35 wherein said support bearing and said journals are arranged such that the smaller end of the cones are facing away from each other and adjacent to the ends of the shaft.

39. A resiliently mounted fluid bearing system as set forth in claim 35 wherein the larger diameter of one of said journals is larger than the larger diameter of the other of said journals.

40. A resiliently mounted fluid bearing system as set forth in claim 30 wherein said journals are removably mounted on said shaft.

41. A resiliently mounted fluid bearing system as set forth in claim 30 further including means forming a thrust plate carried by said shaft, thrust plate support bearings cooperating with said thrust plate, and thrust plate resilient mounting means cooperating with said thrust plate bearing for resiliently mounting the latter.

42. A resiliently mounted fluid bearing system as set forth in claim 41 wherein said thrust plate is located between said journals.

43. A resiliently mounted fluid bearing system as set forth in claim 30 wherein said resilient means includes a double ended shell member having spaced pairs of inner and outer surface support portions, and a pair of spring members one of which is positioned with respect to each of said pairs of surface support portions to urge the latter in opposite radial directions.

44. A resiliently mounted fluid bearing system for use at relatively high rotational speeds comprising:

support means, shaft means having an axis of rotation and including spaced portions forming spaced journals having outer surface portions and arranged along the axis thereof, at least two axially spaced bearing means mounted in spaced relation in said support means and surrounding said shaft means at spaced positions along the axis thereof, each said bearing means including an inner surface portion which is in spaced relation to the outer surface portion of said spaced journals to form a fluid gap therebetween such that the fluid in said gap supports said shaft for rotation with respect to said spaced bearing means, each said bearing means including an outer bearing surface portion in opposed spaced relation to said support means, each said bearing means including resilient means cooperating with said support means and surrounding the outer bearing surface of each said bearing means for mounting each said bearing means resiliently with respect to said support means, each said resilient means including resiliently biased relatively low friction inner and outer surface support portions, the inner surface support portion of said resilient means continuously surrounding and contacting said outer cylindrical surface portion of said bearing means, the outer surface support portion of said resilient means continuously contacting said support means, and thrust plate means carried by said shaft for rotation therewith to resist axial thrust forces on said shaft.

45. A resiliently mounted fluid bearing system as set forth in claim 44 wherein said journals are cylindrical.

46. A resiliently mounted fluid bearing system as set forth in claim 44 wherein said fluid bearing system is a hydrostatic bearing, and said housing including means to introduce gas under pressure into said housing and means for exit of said gas.

47. A resiliently mounted fluid bearing system for use at relatively high rotational speeds comprising:

support means, shaft means having an axis of rotation and including spaced portions forming spaced journals having outer surface portions and arranged along the axis thereof, at least two axially spaced bearing means mounted in spaced relation in said support means and surrounding said shaft means at spaced positions along the axis thereof, each said bearing means including an inner surface portion which is in spaced relation to the outer surface portion of said spaced journals to form a fluid gap therebetween such that the fluid in said gap supports said shaft for rotation with respect to said spaced bearing means, each said bearing means including an outer bearing surface portion in opposed spaced relation to said support means, each said bearing means including resilient means cooperating with said support means and surrounding the outer bearing surface of each said bearing means for mounting each said bearing means resiliently with respect to said support means, and at least one machine spring surrounding said shaft means and spaced therefrom and associated with at least one said resilient means for urging the same axially.

48. A resiliently mounted fluid bearing system as set forth in claim 47 wherein said journals are conical and said support bearings are conical.

49. A resiliently mounted fluid bearing system as set forth in claim 47 wherein said bearing is a hydrostatic bearing, and further including means to introduce fluid under pressure into the fluid gap and for exit of fluid out of said gap.

50. A resiliently mounted fluid bearing system as set forth in claim 49 wherein said bearing has a front end and a back end, and all of the incoming fluid which enters said bearing exiting from the front end thereof.

51. A resiliently mounted fluid bearing system as set forth in claim 47 wherein said bearing means including a bearing housing supporting a bearing member.

52. A resiliently mounted fluid bearing system as set forth in claim 47 wherein said shaft means is hollow.

* * * * *